(12) United States Patent
Desai et al.

(10) Patent No.: US 12,114,072 B2
(45) Date of Patent: *Oct. 8, 2024

(54) ELECTRONIC DEVICES AND CORRESPONDING METHODS FOR PERFORMING IMAGE STABILIZATION PROCESSES AS A FUNCTION OF TOUCH INPUT TYPE

(71) Applicant: Motorola Mobility LLC, Chicago, IL (US)

(72) Inventors: Rahul Bharat Desai, Hoffman Estates, IL (US); Mauricio Dias Moises, Campinas (BR); Amit Kumar Agrawal, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/231,560

(22) Filed: Aug. 8, 2023

(65) Prior Publication Data
US 2024/0022815 A1    Jan. 18, 2024

Related U.S. Application Data

(63) Continuation of application No. 17/752,274, filed on May 24, 2022, now Pat. No. 11,770,612.

(51) Int. Cl.
*H04N 23/68* (2023.01)
*H04N 23/62* (2023.01)
*H04N 23/63* (2023.01)

(52) U.S. Cl.
CPC .......... *H04N 23/683* (2023.01); *H04N 23/62* (2023.01); *H04N 23/631* (2023.01)

(58) Field of Classification Search
CPC .... H04N 23/683; H04N 23/62; H04N 23/631; H04N 23/6812; H04N 23/63;
(Continued)

(56) References Cited

U.S. PATENT DOCUMENTS 9,146,674 B2    9/2015    Karlsson
10,845,921 B2   11/2020   Alameh
(Continued)

OTHER PUBLICATIONS

"Take Photos in the Dark with Night Mode on Your Galaxy Phone", Samsung Support; Unknown Exact Publication Date but believed to be prior to filing of present application; Viewed online https://www.samsung.com/us/support/answer/ANS00086006/.

Goel, et al., "GripSense: Using Built-In Sensors to Detect Hand Posture and Pressure on Commodity Mobile Phones", University of Washington; Published Oct. 7, 2012; Available online at https://faculty.washington.edu/wobbrock/pubs/uist-12.pdf.

(Continued)

*Primary Examiner* — Kelly L Jerabek
(74) *Attorney, Agent, or Firm* — Philip H. Burrus, IV

(57) ABSTRACT

An electronic device includes a device housing supporting a user interface, one or more touch sensors, and at least one image capture device. One or more processors cause, in response to the user interface receiving user input initiating a video capture operation, the at least one image capture device to capture a plurality of video frames. The plurality of video frames are processed with a first video stabilization operation when the electronic device is supported by a multi-handed touch input and a second video stabilization operation when the electronic device is supported by a single-handed touch input. The first video stabilization operation crops less of each image than the second video stabilization operation since the electronic device is likely more stable when supported by the multi-handed touch input.

20 Claims, 9 Drawing Sheets

(58) Field of Classification Search
CPC .... H04N 23/68; H04N 23/682; H04N 23/684; H04N 23/681
See application file for complete search history.

(56) References Cited

U.S. PATENT DOCUMENTS

| | | | |
|---|---|---|---|
| 11,770,612 B1* | 9/2023 | Desai | H04N 23/6812 348/208.4 |
| 2008/0168403 A1 | 7/2008 | Westerman | |
| 2009/0160952 A1 | 6/2009 | Nakakuki | |
| 2010/0315519 A1 | 12/2010 | Watanabe | |
| 2013/0033593 A1 | 2/2013 | Chinook | |
| 2014/0085492 A1 | 3/2014 | Petrescu | |
| 2015/0097978 A1 | 4/2015 | Lee | |
| 2016/0034140 A1 | 2/2016 | Navsariwala | |
| 2016/0165156 A1 | 6/2016 | Liege | |
| 2016/0212333 A1 | 7/2016 | Liege | |
| 2016/0269637 A1 | 9/2016 | Shibata | |
| 2018/0131873 A1 | 5/2018 | Vacura | |
| 2021/0124451 A1 | 4/2021 | Zhao | |
| 2022/0004788 A1 | 1/2022 | Tang | |
| 2024/0022815 A1 | 1/2024 | Desai | |

OTHER PUBLICATIONS

Guiness, Harry , "What is Image Stabilization, and How Does it Work?", How-To-Geek; Published Mar. 15, 2017 online at https://www.howtogeek.com/298560/what-is-image-stabilization-and-how-does-it-work/.

Jerabek, Kelly L. , "Notice of Allowance", U.S. Appl. No. 17/752,274, filed May 24, 2022; Mailed Jun. 29, 2023.

Liang, Chia-Kai , "Fused Video Stabilization on the Pixel 2 and Pixel 2 XL", Google AI Blog; Published Nov. 10, 2017 online at https://ai.googleblog.com/2017/11/fused-video-stabilization-on-pixel-2.html.

Mills, Matt , "How to Take Photos with Night Mode on All Android Phones", ITIGIC; Published Jan. 17, 2021 online at https://itigic.com/how-to-take-photos-with-night-mode-on-all-android-phones/.

Barrett, Ryan S. , "Notice of Allowance", U.S. Appl. No. 17/752,271, filed May 24, 2022; Mailed Apr. 24, 2024.

Wobbrock, et al., "The performance of hand postures in front and back-of-device interaction for mobile computing", Published Mar. 27, 2008; International Journal of Human-Studies 66 (2008) 857-875, https://faculty.washington.edu/wobbrock/pubs/ijhcs-08.pdf.

* cited by examiner

ELECTRONIC DEVICES AND CORRESPONDING METHODS FOR PERFORMING IMAGE STABILIZATION PROCESSES AS A FUNCTION OF TOUCH INPUT TYPE

CROSS REFERENCE TO PRIOR APPLICATIONS

This application is a continuation application claiming priority and benefit under 35 U.S.C. § 120 from U.S. application Ser. No. 17/752,274, filed May 24, 2022, which is incorporated by reference for all purposes.

BACKGROUND

Technical Field

This disclosure relates generally to electronic devices, and more particularly to electronic devices having image capture devices.

Background Art

The use of portable electronic devices, such as smartphones and tablet computers, has become ubiquitous. With increasing computational power, the owners of such devices use the same not only to communicate with others, but also to manage financial accounts, track health information, manage calendaring and address book data, watch television shows and movies, interact with social media sites, engage in on-line commerce, and to surf the web.

Most of these electronic devices include some form of image capture device, which may include one or more cameras. In addition to being able to capture still images, these image capture devices can also be used to capture multiple, sequential frames in the form of video. As the quality of these cameras has improved, people are increasingly using the image capture devices in smartphones and tablet computers as their primary image and image capture device, eschewing traditional (and larger) stand-alone cameras such as single-lens-reflex cameras. It would be advantageous to have methods and systems to make the image capture devices of portable electronic devices perform even more optimally so as to increase the quality of captured video frames.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
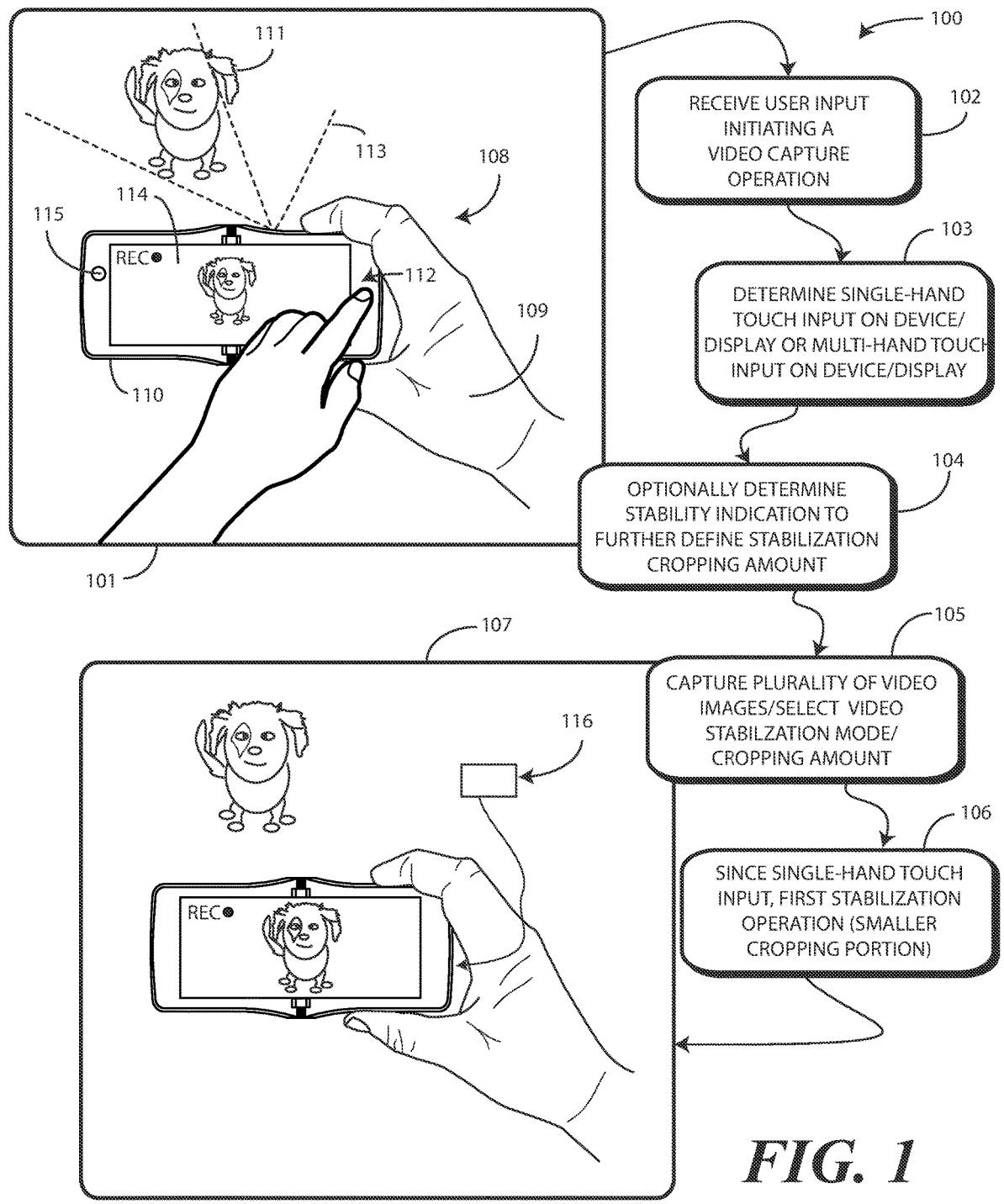
FIG. 1 illustrates one explanatory method and system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining whether a received touch input is a single-handed touch input or a multi-handed touch input and processing a plurality of video frames with a first video stabilization operation when one or more touch sensors detect a multi-handed touch input while processing the plurality of video frames with a second video stabilization operation when the one or more touch sensors detect a single-handed touch input. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of processing a plurality of video frames with a first video stabilization operation when an electronic device is being supported by a multi-handed touch input and processing the plurality of video frames with a second video stabilization operation when the electronic device is being supported by a single-handed touch input. The non-processor circuits may include, but are not limited to, an image capture device, a radio receiver, a radio transmitter, signal drivers, clock circuits, power source circuits, and user input devices.

As such, these functions may be interpreted as steps of a method to cause a plurality of video frames to undergo a first video stabilization process when one or more of a device housing of the electronic device and/or the display of the electronic device is receiving single-handed touch input, while causing the plurality of video frames to undergo a second video stabilization process when the device housing and/or display of the electronic device is receiving multi-handed touch input. In one or more embodiments, the first video stabilization process is based upon a portion of each frame of the plurality of video frames that is smaller than the second video stabilization process. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods, devices, and systems that capture a plurality of video frames and process that plurality of video frames based upon the type of touch input an electronic device is receiving when the plurality of video frames are captured. In one or more embodiments, when one or more touch sensors determine that the electronic device is receiving a multi-handed touch input, one or more processors process the plurality of video frames with a first video stabilization operation when one or more touch sensors of the electronic device detect a multi-handed touch input. By contrast, the one or more processors process the plurality of video frames with a second video stabilization operation when the one or more touch sensors detect a single-handed touch input.

In one or more embodiments, the first video stabilization operation and the second video stabilization operation are different. Illustrating by example, in one or more embodiments the first video stabilization operation is a function of a first cropped portion of the plurality of video frames. The second video stabilization operation is a function of a second cropped portion of the plurality of video frames. In one or more embodiments, the first cropped portion comprises a larger portion of each frame of the plurality of video frames than the second cropped portion.

Embodiments of the disclosure contemplate that the amount of "shake" a handheld electronic device experiences is reduced when a user is holding the electronic device with two hands. This is true because the electronic device can be balanced better when two hands are used. Additionally, the electronic device is less likely to move when a user initiates a video capture operation by, for example, tapping a user interface icon corresponding to a "record" button. Accordingly, embodiments of the disclosure employ this touch input as a proxy for device stabilization to select how "aggressive" the video stabilization processing should be in response to user input initiating a video capture operation.

Embodiments of the disclosure contemplate that since portable electronic devices are generally handheld, they often move while being used to capture one or more video frames. To prevent captured vide from appearing to be like scenes from the Blair Witch Project, which is renowned for its shaky imagery, many modern electronic devices employ image stabilization processes to digitally "smooth" movement between video frames.

In contrast to physical or "optical" image stabilization, where lens components physically move to counter motion of the overall device, in small electronic devices such as smartphones electronic or "virtual" image stabilization is employed where one or more processors perform operations to counter any device movement algorithmically. Sometimes referred to as "artificial" image stabilization, one or more processors operate using artificial intelligence to predict where the subject of one or more video frames is moving to maintain focus of the subject within those frames. After that, the frames are cropped to prevent the images from looking shaky.

This artificial image stabilization can be more aggressive, where larger portions of each frame of the plurality of video frames are cropped away, or less aggressive where smaller portions of each frame of the plurality of video frames are cropped away. Said differently, when the image stabilization is more aggressive, the resulting frames comprise a smaller portion of the original because larger portions of each original frame are cropped away. When the image stabilization is less aggressive, a larger portion of each from of the plurality of video frames remains because a smaller portion of each frame is cropped away.

Since movement of an electronic device capturing the plurality of video frames can affect how much of the frames are lost in the video stabilization process, embodiments of the disclosure advantageously determine how aggressive the video stabilization process will be as a function of the type of touch input that is supporting the electronic device when the video frames are captured. In one or more embodiments, when the electronic device is being supported by multi-handed touch input when the plurality of video frames is captured, one or more processors process the plurality of video frames with a less aggressive video stabilization process due to the fact that the electronic device is likely to be more stable when supported by multiple hands. However, when the electronic device is being supported by the single-handed touch input, which is more likely to allow the electronic device to move when the plurality of video frames is being captured, the one or more processors process the plurality of video frames with a more aggressive video stabilization process.

Accordingly, in one or more embodiments the one or more processors process the plurality of video frames with a first video stabilization operation when one or more touch sensors of the electronic device detect a multi-handed touch input. By contrast, when the one or more touch sensors detect a single-handed touch input, the one or more processors process the plurality of video frames with a second video stabilization process that crops a larger portion of each frame away. While more information is lost, video stabilization is enhanced, thereby keeping the video frames smooth, stable, and professional looking.

Advantageously, embodiments of the disclosure use touch input as a proxy for device stabilization to select a video stabilization process with which to process video frames. When the electronic device is receiving a multi-handed touch input, embodiments of the disclosure conclude that a user is trying to hold the electronic device in a very stable manner. Accordingly, one or more processors of the electronic device cause the plurality of video frames to undergo a first video stabilization process. By contrast, when a person is supporting an electronic device with only a single-handed touch input, the one or more processors cause the plurality of video frames to undergo a second video stabilization process that crops more of the image away than does the first video stabilization process.

In one or more embodiments, when the multi-handed touch input is detected, the initiation of a video capture operation to capture a video with an image capture device results in captured video frames undergoing a first video stabilization process. Illustrating by example, when a person is trying to hold the electronic device in a very still mode with both hands while capturing a video, one or more processors of the electronic device may cause the video frames to undergo a video stabilization process that crops a smaller portion of each frame away than does another video stabilization process that crops more of each frame. This results in less information being lost and more content of each frame remaining in the video. By contrast, when one or more touch sensors detect that the electronic device is being supported by a single-handed touch input, the one or more processors cause the video frames to undergo a second video stabilization process that is based upon a smaller portion of each frame of the plurality of video frames than is the first video stabilization process. While this results in more content of each frame being cropped away, it results in a stable and smooth video. Advantageously, embodiments of the disclosure combine a grip detection proxy for a user's intent with a dynamic video stabilization process to obtain enhanced video quality while maximizing the content that remains in each frame and while minimizing computational bandwidth and processing time.

In one or more embodiments, an electronic device includes a device housing supporting a user interface, one or more touch sensors, and at least one image capture device. The electronic device also includes one or more processors operable with the user interface, the one or more touch sensors, and the at least one image capture device.

In one or more embodiments, the one or more processors cause, in response to the user interface receiving user input initiating a video capture operation, the at least one image capture device to capture a plurality of video frames. When the one or more touch sensors detect a multi-handed touch input, the video frames are processed by a first video stabilization operation. By contrast, when the one or more touch sensors detect a single-handed touch input, the video frames are processed with a second video stabilization operation. In one or more embodiments, the first video stabilization operation and the second video stabilization operation are different. The first video stabilization operation may be a function of a first cropped portion of each frame of the plurality of video frames, while the second video stabilization operation may be a function of a second cropped portion of each frame of the plurality of video frames. In one or more embodiments, the first cropped portion comprises a large portion of each video frame of the plurality of video frames than the second cropped portion, which means that more original content remains within the video since less is cut away due to the more stable support afforded by the multi-handed touch input.

Lighting conditions can also affect the video stabilization process, as the benefits of video stabilization process are sometimes more tied to low-light video capture. Thus, in one or more embodiments the electronic device comprises a light sensor. In one or more embodiments, the one or more processors cause the at least one image capture device to use the video stabilization process cropping away more of the content only when the one or more touch sensors detect the single-handed touch input concurrently with the light sensor detecting a low-light condition within an environment of the electronic device. In one or more embodiments, the low-light condition is characterized by a light density of less than one hundred lux within an environment of the electronic device.

The light sensor can be used in other ways as well. For instance, when the light sensor detects an unbalanced ambient light level within an environment of the electronic device, such as when a scene includes sunlight shining through a window into a dark room, the one or more processors can cause the at least one image capture device to process the video frames with a video stabilization process cropping away more of the image when the electronic device is being supported by the single-handed touch input and the unbalanced ambient light level within the environment of the electronic device exceeds a predefined threshold.

A motion sensor can also be used to alter select the video stabilization process as well. In one or more embodiments, one or more processors detect, using a motion sensor, a stability indication of the electronic device in response to a user input initiating a video capture operation. In one or more embodiments, the one or more processors increase the amount of each frame of the plurality of video frames that is cropped away when the stability indication of the electronic device is less than a predefined threshold.

In its most basic form, touch input is used as the input selector to determine which video stabilization process should be used to process the plurality of video frames. One or more touch sensors simply determine whether the user is gripping the electronic device with one hand or two. Said differently, the one or more touch sensors determine whether the electronic device is receiving a multi-handed touch input or a single-handed touch input.

This can be determined in any number of ways. For instance, in one or more embodiments the one or more touch sensors detect the multi-handed touch input when receiving touch input from the fingers or a palm on both sides of a user interface, one example of which is a touch-sensitive display. Alternatively, one or more processors may monitor a motion sensor such as an accelerometer to determine the motion of the electronic device.

In still other embodiments, another image capture device facing the user can determine whether its field of view is blocked by a user's hand or fingers to determine that the electronic device is receiving the multi-handed touch input. Embodiments of the disclosure presume that the other image capture device facing the user may indeed have its field of view blocked by a hand when holding the electronic device from the opposite edges while capturing a video with the image capture device facing away from the user. Accordingly, a blocked field of view of an image capture device facing a user can be used to identify, or alternatively confirm, that the electronic device is being supported by the multi-handed touch input. Other techniques for detecting the multi-handed touch input will be described below. Still others will be obvious to those of ordinary skill in the art having the benefit of this disclosure.

In one or more embodiments, when a multi-handed touch input is detected, in response to a user pressing a shutter "button," one or more processors cause the image capture device to capture a plurality of video frames. One or more processors of the electronic device process the plurality of video frames with a first video stabilization operation when the electronic device is being supported by the multi-handed touch input while the plurality of video frames are captured. By contrast, the one or more processors process the plurality of video frames with a second video stabilization operation when the electronic device is being supported by the single-handed touch input while the plurality of video frames are captured. For example, the cropped portion when using the second video stabilization operation may crop away at least twenty percent more of each video frames of the plurality of video frames in one or more embodiments. Advantageously, embodiments of the disclosure combine grip detection and dynamic video stabilization process selection to provide stable video retaining as much originally captured information as possible.

Turning now to FIG. 1, illustrated therein is one explanatory method 100 and system 108 in accordance with one or more embodiments of the disclosure. Beginning at step 101, a user 109 is directing an image capture device operating as a video capture device (located on the rear side) of an electronic device 110 toward a subject 111. The user 109 is also delivering user input 112 initiating a video capture operation causing the image capture device to capture a plurality of video frames 113 of the subject 111. In this illustrative embodiment, the user input 112 comprises the user 109 touching a physical button situated on the electronic device 110. In other embodiments, the user input 112 might comprise the user delivering touch input to a user actuation target or other icon presented on the display 114 of the electronic device 110. Other options for delivering user input 112 to the electronic device 110 to initiate the video capture operation will be obvious to those of ordinary skill in the art having the benefit of this disclosure. The user input 112 is received at step 102.

In one or more embodiments, the electronic device 110 is equipped with a light sensor. In one or more embodiments, the light sensor can detect lighting conditions within an environment of the electronic device, changes in light levels or optical intensities, as well as changes in color, light, or shadow. This information can assist one or more processors of the electronic device 110 in configuring the settings for the image capture device when capturing plurality of video frames 113.

Illustrating by example, the light sensor may be operable to sense a lighting condition within an environment of the electronic device 110. The light sensor may determine whether the lighting condition within the environment of the electronic device 110 is a low-light environment, such as when there is a light density of less than one hundred lux within the environment of the electronic device 110. While this is one explanatory threshold indicative of a low-light condition, others will be obvious to those of ordinary skill in the art having the benefit of this disclosure.

In one or more embodiments the electronic device 110 is equipped with one or more touch sensors. These touch sensors can take a variety of forms. Illustrating by example, in one embodiment the display 114, which can be touch-sensitive, serves as a touch sensor by detecting when a hand or finger is touching its surface. In other embodiments, the touch sensors can include a capacitive touch sensor, an infrared touch sensor, resistive touch sensors, inductive touch sensors, or another touch-sensitive technology. The touch sensors can comprise force sensors and/or pressure sensors as well.

In one or more embodiments, a front-facing imager 115 can even serve as a touch sensor. When the field of view of the front-facing imager 115 is blocked, occluded, or obscured by an object proximately located with the electronic device, this can indicate that the user 109 is holding the end of the electronic device 110 on which the front-facing imager 115 is situated.

Illustrating by example, in FIG. 1 the front-facing imager 115 is situated on the left side of the electronic device 110 as it is being held in landscape mode. The physical button is located on the opposite side of the electronic device 110. If the user 109 were using a two-handed grip at step 101, rather than the one-handed grip shown in the figure, the user 109 would likely hold the left side of the electronic device 110 so that the display 114 could be seen between the two hands. This likely would obscure the field of view of the front-facing imager 115. Accordingly, the front-facing imager 115 can function as a touch sensor in addition to capturing images and/or video frames in one or more embodiments.

Figure 4:
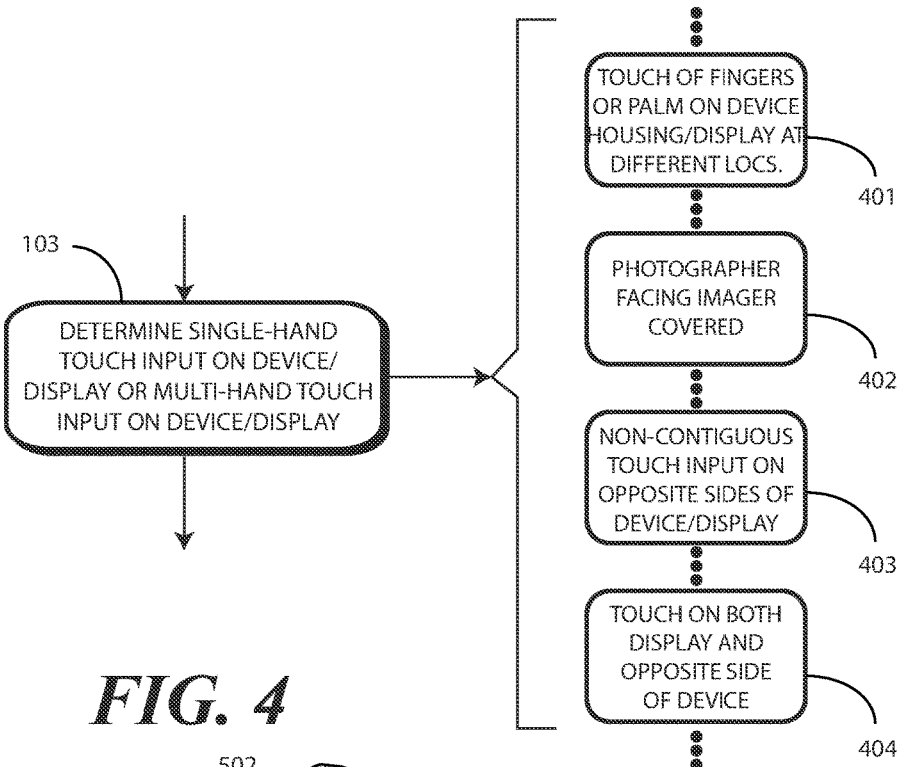
FIG. 4 illustrates one or more explanatory options for determining whether touch input is multi-handed touch input or single-handed touch input in accordance with one or more embodiments of the disclosure.

At step 103, the one or more touch sensors determine whether the electronic device 110 is receiving a single-handed touch input or a multi-handed touch input. Said differently, at step 103 the one or more touch sensors determine whether the electronic device 110 is being supported by a single hand, as shown at step 101, or by two hands, as will be shown below with reference to FIG. 2. This determination can be made in a variety of ways. Turning briefly to FIG. 4, illustrated therein are a few examples.

In one or more embodiments, a multi-handed touch input is detected at step 103 when the one or more touch sensors detect, at stage 401, a first touch input at a first location and a second touch input at a second location. In other embodiments, touch input must be received on opposite sides of the display (114) for the multi-handed touch input indication. In one or more embodiments, a multi-handed touch input is detected at step 103 when the one or more touch sensors detect, at stage 403, a first touch input at a first location and a second touch input at a second location that is separated from the first location by the display (114). Said differently, if the user (109) were touching the electronic device (110) on the left side of the display (114) and the right side of the display (114), in one or more embodiments this would be construed by one or more processors of the electronic device (110) as a multi-handed touch input.

In other embodiments, a multi-handed touch input is detected at step 103 when, at stage 404, touch input is received on two sides of the electronic device (110). In the illustrative embodiment of FIG. 1, the display (114) is positioned on a first major surface of the electronic device (110), which is the major surface defined by the surfaces of the first device housing and second device housing facing the user. The rear-facing imager is then positioned on a second side of the electronic device (110), which is the major surface facing the subject (111). In one or more embodiments, when the electronic device (110) comprises a display (114) positioned on a first major surface of the electronic device, step 103 results in a multi-handed touch input being detected, at stage 404, when the one or more touch sensors detect a first touch input on the display (114) and a second touch input on the second major surface of the electronic device (110).

As noted above, the front-facing imager (115) can be used as a touch sensor as well. In the illustrative embodiment of FIG. 1, the front-facing imager (115) and display are situated on the same major surface of the electronic device (110), i.e., the major surface defined by the first device housing and the second device housing that are facing the user (109). The image capture device that will capture the plurality of video frames of the subject (111) is situated on the second major surface of the electronic device (110).

In one or more embodiments, at step 103 one or more processors of the electronic device (110) cause the front-facing imager (115) to check, at stage 402, its field of view for obscuration, blockage, occlusion, or covering. In one or more embodiments, step 103 will indicate that the electronic device (110) is being supported by the multi-handed touch input when, at stage 402, the field of view of the front-facing imager (115) is obscured by an object proximately located with the electronic device (110). Note that this process can be reversed when the front-facing imager (115) is being used to capture a "selfie," as the user (109) may obscure the field of view of the rear-facing imager when using the multi-handed touch input as well.

Turning now back to FIG. 1, in one or more embodiments the electronic device 110 also includes a motion detector. At step 104, the motion detector can optionally determine an orientation and/or movement of the electronic device 110 in three-dimensional space. Illustrating by example, the motion detector can include an accelerometer, gyroscopes, or other device to detect device orientation and/or motion of the electronic device 110. Using an accelerometer as an example, an accelerometer can be included to detect motion of the electronic device 110. Additionally, the accelerometer can be used to sense some of the gestures of the user, such as one talking with their hands, running, or walking.

In one or more embodiments, the motion detector can determine the spatial orientation of an electronic device 110 in three-dimensional space by, for example, detecting a gravitational direction. In addition to, or instead of, an accelerometer, an electronic compass can be included to detect the spatial orientation of the electronic device 110 relative to the earth's magnetic field. Similarly, one or more gyroscopes can be included to detect rotational orientation of the electronic device 110.

At optional step 104, the motion detector can determine an amount of motion the electronic device 110 is experiencing in three-dimensional space. This can be done for a variety of reasons, including for the purpose of using the motion indication as an input to determine how much of an image to crop when applying a video stabilization process or operation. The amount of motion can also be used in other post-processing operations. In one or more embodiments, optional step 104 comprises detecting, with the motion sensor, a stability indication of the electronic device 110 in response to the user input 112 initiating the video capture operation to determine whether the stability indication is above, or below, a predefined threshold.

At step 105, the one or more processors of the electronic device 110 cause the image capture device to capture a plurality of video frames 113 of the subject 111 in response to the user input 112 initiating the video capture operation. In one or more embodiments, in response to the user input 112 initiating the video capture operation, the one or more processors also select a video stabilization process or video stabilization operation that will be used in processing the plurality of video frames.

In contrast to optical image stabilization where lens components of the image capture device physically move to counter motion of the overall electronic device 110, which can be used in accordance with embodiments of the present disclosure, the method 100 of FIG. 1 applies virtual image stabilization to ensure that the plurality of video frames 113, when viewed by the user 109, look smooth and professional. Using this process, one or more processors of the electronic device 110 perform operations to counter any device movement algorithmically. In one or more embodiments, one or more processors of the electronic device 110 use artificial intelligence to predict where the subject 111 of one or more video frames 113 is moving to maintain focus of the subject 111 within those video frames 113. After that, each frame of the plurality of video frames 113 is cropped to prevent the resulting video from looking shaky.

This video stabilization process can be more aggressive, where larger portions of each frame of the plurality of video frames 113 are cropped away. Alternatively, the video stabilization process can be less aggressive where smaller portions of each frame of the plurality of video frames 113 are cropped away. Said differently, when the image stabilization operation is more aggressive, the resulting frames comprise a smaller portion of the original because larger portions of each original frame are cropped away. When the image stabilization operation is less aggressive, a larger portion of each from of the plurality of video frames 113 remains because a smaller portion of each frame is cropped away.

Since movement of an electronic device 110 capturing the plurality of video frames 113 can affect how much of the frames are lost in the video stabilization process, embodiments of the disclosure advantageously determine how aggressive the video stabilization process will be as a function of the type of touch input that is supporting the electronic device 110 when the plurality of video frames 113 is captured. In one or more embodiments, when the electronic device 110 is being supported by multi-handed touch input, as determined at step 103, when the plurality of video frames 113 is captured, one or more processors of the electronic device 110 select, at step 105, a process for the plurality of video frames with a less aggressive video stabilization operation due to the fact that the electronic device 110 is likely to be more stable when supported by multiple hands. However, when the electronic device 110 is being supported by the single-handed touch input, as shown at step 101 and as detected at step 103, which is more likely to allow the electronic device 110 to move when the plurality of video frames 113 is being captured, the one or more processors select, at step 105, a process for the plurality of video frames 113 having a more aggressive video stabilization process.

Accordingly, in one or more embodiments the one or more processors process the plurality of video frames 113 with a first video stabilization operation when one or more touch sensors of the electronic device detect, at step 103, a multi-handed touch input. By contrast, when the one or more touch sensors detect at step 103 a single-handed touch input, the one or more processors process the plurality of video frames 113 with a second video stabilization process that crops a larger portion of each frame away. While more information is lost, video stabilization is enhanced, thereby keeping the video frames smooth, stable, and professional looking.

In accordance with embodiments of the disclosure, the video stabilization process used on the plurality of video frames 113 is selected as a function of whether the electronic device 110 is being supported by a single-handed touch input or a multi-handed touch input. The video stabilization process selected can also be a function of the lighting level within the environment of the electronic device 110.

Illustrating by example, in one or more embodiments step 105 comprises selecting a first video stabilization operation for processing the plurality of video frames 113 when the one or more touch sensors detect, at step 103, a multi-handed touch input. At step 105 the one or more processors select a second video stabilization operation for processing the plurality of video frames 113 when the one or more touch sensors detect a single-handed touch input at step 103. In one or more embodiments, the first video stabilization operation and the second video stabilization operation are different.

In one or more embodiments, the first video stabilization operation is a function of a first cropped portion of the plurality of video frames 113, while the second video stabilization operation is a function of a second cropped portion 116 of the plurality of video frames 113. In one or more embodiments, the first cropped portion comprises a larger portion of the plurality of video frames 113 than the second cropped portion 116. This means that when the second video stabilization operation is used, a larger portion of each frame of the plurality of video frames 113 is cropped away in the video stabilization process.

In the illustrative embodiment of FIG. 1, the electronic device 110 is being supported by a single-handed touch input as shown at step 107. Accordingly, at step 106 one or more processors of the electronic device 110 cause, in response to the user interface of the electronic device 110 receiving the user input 112 initiating the video capture operation, the plurality of video frames 113 to be processed by a second video stabilization operation that crops away more of each video frame than the first video stabilization operation that is used when the electronic device 110 is being supported by a multi-handed touch input. In one or more embodiments, the second cropped portion 116 that remains is at least twenty percent smaller than the first cropped portion that would remain if the first video stabilization operation were employed. However, this cropping amount is illustrative only, as other amounts will be obvious to those of ordinary skill in the art having the benefit of this disclosure.

Figure 2:
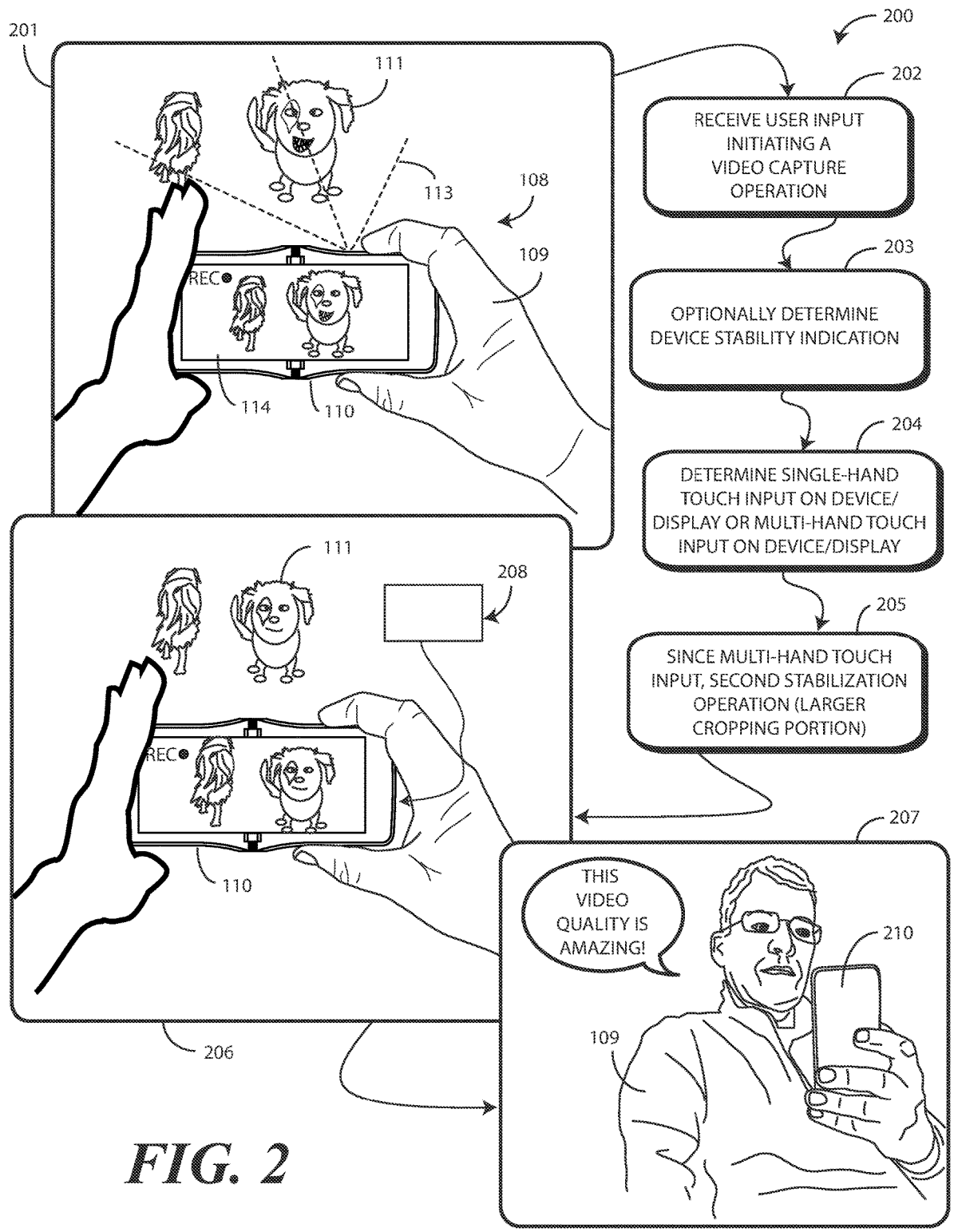
FIG. 2 illustrated therein is another explanatory method and system in accordance with one or more embodiments of the disclosure.

Turning now to FIG. 2, illustrated therein is another method 200 and system 108 in accordance with one or more embodiments of the disclosure. The method 200 of FIG. 2 is similar to the method (100) of FIG. 1. However, rather than being supported by the single-handed touch input, in FIG. 2 the electronic device 110 is being supported by a multi-handed touch input as shown at step 201.

Beginning at step 201, a user 109 is again directing an image capture device (located on the rear side) of an electronic device 110 toward a subject 111. The user 109 has already delivered (in similar fashion to that described above with reference to step (101)) user input (112) initiating a video capture operation causing the image capture device to capture a plurality of video frames 113 of the subject 111. The user input (112) is received at step 202.

At optional step 203, a motion sensor of the electronic device determines a stability indication of the electronic device 110 in response to the user input received at step 202 initiating the video capture operation. This stability indication can be used it alter the cropping of the video stabilization process selected and used at step 205. Illustrating by example, when the stability indication of the electronic device is less than a predetermined threshold, the first cropped portion 208 used with the first video stabilization operation can be increased, thereby leaving more original content in each video frames of the plurality of video frames 113.

At step 204, the one or more touch sensors determine whether the electronic device 110 is receiving a single-handed touch input or a multi-handed touch input. Said differently, at step 204 the one or more touch sensors determine whether the electronic device 110 is being supported by a single hand, as was shown above at step (101), or by two hands, as shown at step 201.

As noted above, this determination can be made in a variety of ways. In one or more embodiments, a multi-handed touch input is detected at step 204 when the one or more touch sensors detect a first touch input at a first location and a second touch input at a second location that is separated from the first location by the display 114. This is occurring in step 201. Said differently, at step 201 the user 109 is touching the electronic device 110 on the left side of the display 114 and the right side of the display 114. Accordingly, step 204 returns an indication of multi-handed touch input.

In other embodiments, a multi-handed touch input is detected at step 204 when touch input is received on two sides of the electronic device 110. In one or more embodiments, when the electronic device 110 comprises a display 114 positioned on a first major surface of the electronic device, step 204 results in a multi-handed touch input being detected when the one or more touch sensors detect a first touch input on the display 114 and a second touch input on the second major surface of the electronic device 110.

As shown at step 201, the user's left hand is obscuring the front-facing imager (115). Accordingly, the front-facing imager (115) can be used as a touch sensor or to confirm that touch input is occurring. In one or more embodiments, at step 204 one or more processors of the electronic device 110 cause the front-facing imager (115) to check its field of view for obscuration, blockage, occlusion, or covering. This is occurring at step 201. Accordingly, step 204 will indicate that the electronic device 110 is being supported by the multi-handed touch input due to the fact the field of view of the front-facing imager (115) is obscured by an object proximately located with the electronic device 110, which is the user's left hand in this example. Again, it should be noted that this process can be reversed when the front-facing imager (115) is being used to capture a "selfie," as the user 109 may obscure the field of view of the rear-facing imager when using the multi-handed touch input as well.

At step 205, the one or more processors of the electronic device 110 select between the first video stabilization operation and the second video stabilization operation and apply the selected video stabilization process to the plurality of video frames 113 captured in response to the user input initiating the video capture operation. In accordance with embodiments of the disclosure, the video stabilization process is selected as a function of whether the electronic device 110 is being supported by a single-handed touch input or a multi-handed touch input. The video stabilization process selected can also be a function of the motion of the electronic device 110 when optional step 203 is included in the method 200. The amount of cropping used in the selected video stabilization process can be affected by the stability indication when step 203 is included in the method 200.

As described above, in one or more embodiments step 205 comprises processing the plurality of video frames 113 with a first video stabilization operation when the one or more touch sensors detect a multi-handed touch input. However, when the one or more touch sensors detect a single-handed touch input, step 205 comprises processing the plurality of video frames 113 with a second video stabilization operation. The first video stabilization operation crops less of each video frame away than the second video stabilization operation in one or more embodiments. In one or more embodiments, the first cropped portion 208 that remains when using the first video stabilization operation is at least twenty percent larger than the second cropped portion (116) that remains when the second video stabilization operation is applied.

In the illustrative embodiment of FIG. 2, the electronic device 110 is being supported by a multi-handed touch input as shown at step 206. Accordingly, at step 205 one or more processors of the electronic device 110 cause, in response to the user interface of the electronic device 110 receiving the user input (112) initiating the video capture operation, the plurality of video frames 113 to be processed by a first video stabilization operation. In one or more embodiments, the first cropped portion 208 remaining after the first video stabilization operation is applied is at least twenty-percent larger than the second cropped portion (116) that remains when the second video stabilization operation is applied. However, this threshold is illustrative only, as other amounts of cropping will be obvious to those of ordinary skill in the art having the benefit of this disclosure. Moreover, this cropping amount can be increased or decreased as the stability indication of the electronic device 110 decreases or increases, respectively.

In addition to the determination of whether the electronic device 110 is being supported by the single-handed touch input or the multi-handed touch input, other factors can affect the video stabilization process selected in response to user input (112) initiating a video capture operation. Illustrating by example, in one or more embodiments the one or more processors of the electronic device select the first video stabilization operation when the one or more touch sensors detect the multi-handed touch input while the user input (112) initiating the video capture operation is received. Such would be the case in the illustrative example of FIG. 2 if, for example, the user's hands were positioned as shown at step 201 and the user 109 used the right thumb to deliver the user input (112) received at step 202.

Where light detection is included, step 205 may comprise the one or more processors of the electronic device 110 causing the plurality of video frames 113 to be processed with the first video stabilization operation only when the one or more touch sensors detect the multi-handed touch input concurrently with the light sensor detecting the low-light condition within the environment of the electronic device 110. Accordingly, if the light density in the environment of the electronic device 110 is less than one hundred lux when step 204 determines the electronic device 110 is being supported by the multi-handed touch input, step 205 might comprise the one or more processors causing the plurality of video frames 113 to be processed with the first video stabilization operation in response to the user input (112) received at step 202. In one or more embodiments, a low-light condition is a condition precedent for selection and application of the first video stabilization operation, with the same occurring only when both the low-light condition and the multi-handed touch input occur.

Where a motion detector is included and step 203 is included between step 204 and step 202 of the method 200 of FIG. 2, the stability indication can be used to alter the amount of cropping of each frame of the plurality of video frames 113. Illustrating by example, when step 203 is included and the stability indication of the electronic device 110 is less than a predefined threshold, the amount of cropping occurring in the first video stabilization operation may be increased. Said differently, when the stability indication of the electronic device 110 is below a predefined threshold, in one or more embodiments the first video stabilization operation crops more information from the plurality of video frames 113 due to the fact that the electronic device 110 is moving. The same type of adjustment can be made in the second video stabilization operation as well.

Since the video stabilization process reduces shake and motion of the video, this results in an overall higher quality and more professional looking video. Thus, when the user 109 views the final video, even on a device having a larger display and/or higher image resolution presentation capability such as the tablet computer 210 of step 207, they can be presented with a professional vide due to the fact that the plurality of video frames 113 were processed with a video stabilization process selected at step 205 to achieve increased stability of appearance, even in low-light conditions or when the stability indication of the electronic device 110 is less than the predefined threshold. As shown at step 207, the user 109 thinks the quality of the video is incredible, despite the fact that he thought his hand was a bit shaky when capturing the plurality of video frames 113.

In effect, the selection of the video stabilization process as a function of whether the electronic device 110 was being supported by a single-handed touch input or a multi-handed touch input allows for resulting videos to be stable and professional, and free of visual distortion, blur, or other artifacts. All the user 109 had to do was hold the electronic device 110, actuate the image capture device, and direct its field of view toward the subject 111. The selection of whether to process the plurality of video frames 113 with the first video stabilization operation or the second video stabilization operation ensured that the resulting video would be of superior quality, even in low-light conditions, all while maximizing content included in the video and minimizing processing power and image processing time.

Figure 3:
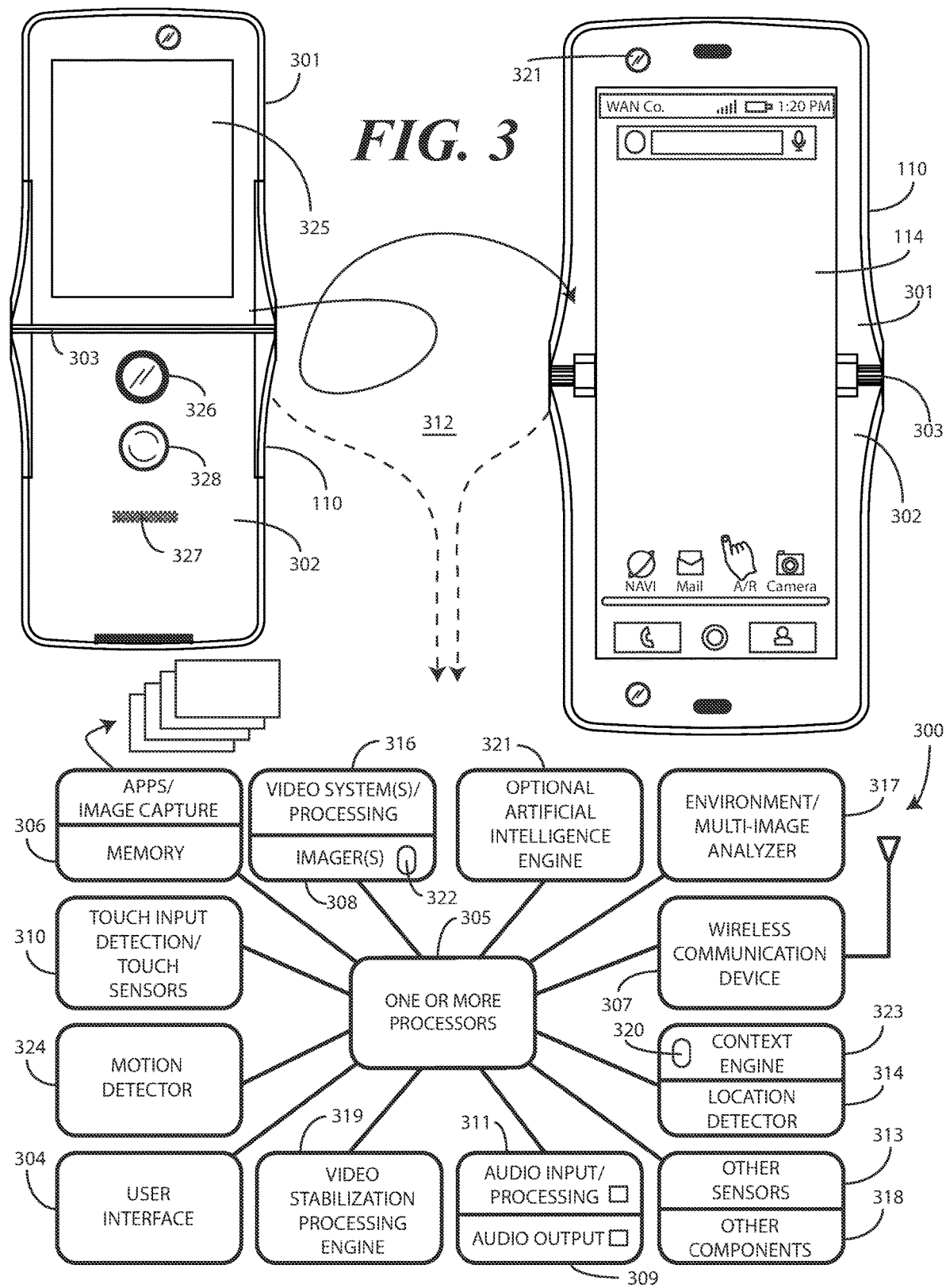
FIG. 3 illustrates one explanatory electronic device in accordance with one or more embodiments of the disclosure.

Turning now to FIG. 3, illustrated therein are more details of one explanatory electronic device 110 configured in accordance with one or more embodiments of the disclosure. While illustrated as a hinged electronic device, the electronic device 110 could include a singular housing that is not deformable and has no hinge, configured in a traditional "candy bar" form factor as well. Where configured as a candy bar, the display 114 of electronic device 110 would remain exposed and accessible. By contrast, where configured as a hinged device having a first device housing 301 that is selectively pivotable about a hinge 303 relative to the second device housing 302 between a closed position and an axially displaced open position, the display 114 of the electronic device 110 can be selectively concealed and revealed, depending upon whether the electronic device is in the closed position or the axially displaced open position.

The electronic device 110 of FIG. 3 is configured as a portable electronic device, and for illustrative purposes is configured as a smartphone. However, the electronic device 110 could be configured in other ways as well. For example, the electronic device 110 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

The illustrative electronic device 110 of FIG. 3 includes multiple displays 114,325. A secondary display 325, which can be coupled to either of the first device housing 301 or the second device housing 302, is coupled to the first device housing 301 in this embodiment. This display 325 is considered to be an "exterior" display due to the fact that it is exposed when the first device housing 301 and the second device housing 302 are in the closed position.

The primary display, i.e., display 114, can also be coupled to either or both of the first device housing 301 or the second device housing 302. In this illustrative embodiment, the display 114 is coupled to both the first device housing 301 and the second device housing 302 and spans the hinge 303. In other embodiments, this display 114 can be replaced by two displays, with one coupled to the first device housing 301 and another coupled to the second device housing 302. In either case, this display 114 is considered to be an "interior" display because it is concealed when the first device housing 301 and the second device housing 302 are in the closed position. Either or both of display 114 and/or display 325 can be touch sensitive.

Features can be incorporated into the first device housing 301 and/or the second device housing 302. Examples of such features include an optional camera 326, which was used as the image capture device in the methods (100,200) of FIGS. 1-2, or an optional speaker port 327. Each is shown disposed on the rear side of the electronic device 110 in FIG. 3, but image capture devices could be placed on the front side instead of, or in addition to, camera 326 as well. Illustrating by example, in this illustrative embodiment at least one image capture device 308 is positioned on the front side of the electronic device 110 as well. In this illustrative embodiment, an optional user interface component 328, which may be a button or touch sensitive surface, can also be disposed along the rear side of the second device housing 302.

Also illustrated in FIG. 3 is one explanatory block diagram schematic 300 of one or more components suitable for inclusion the electronic device 110. In one or more embodiments, the block diagram schematic 300 is configured as a printed circuit board assembly disposed within the first device housing 301 and/or second device housing 302 of electronic device 110. Various components can be electrically coupled together by conductors or a bus disposed along one or more printed circuit boards. It should be noted that the block diagram schematic 300 includes many components that are optional, but which are included in an effort to demonstrate how varied electronic devices configured in accordance with embodiments of the disclosure can be.

Thus, it is to be understood that the block diagram schematic 300 of FIG. 3 is provided for illustrative purposes only and for illustrating components of one electronic device 110 in accordance with embodiments of the disclosure. The block diagram schematic 300 of FIG. 3 is not intended to be a complete schematic diagram of the various components required for an electronic device 110. Therefore, other electronic devices in accordance with embodiments of the disclosure may include various other components not shown in FIG. 3 or may include a combination of two or more components or a division of a particular component into two or more separate components, and still be within the scope of the present disclosure.

The illustrative block diagram schematic 300 of FIG. 3 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

The illustrative block diagram schematic 300 includes a user interface 304. In one or more embodiments, the user interface 304 includes the display 114, which may optionally be touch sensitive. In one embodiment, users can deliver user input to the display 114 by delivering touch input from a finger, stylus, or other objects disposed proximately with the display 114.

For electronic device 110, since the display 114 spans the hinge 303, it is configured to be flexible. For instance, in one embodiment this display 114 is configured as an organic light emitting diode (OLED) display fabricated on a flexible plastic substrate. This allows the display 114 to be flexible so as to deform when the first device housing 301 pivots about the hinge 303 relative to the second device housing 302. However, it should be noted that other types of displays would be obvious to those of ordinary skill in the art having the benefit of this disclosure. In other embodiments conventional, rigid displays can be disposed to either side of the hinge 303 rather than using a flexible display.

In one embodiment, the display 114 is configured as an active-matrix organic light emitting diode (AMOLED) display. However, it should be noted that other types of displays, including liquid crystal displays, would be obvious to those of ordinary skill in the art having the benefit of this disclosure.

In one embodiment, the electronic device 110 includes one or more processors 305. In one embodiment, the one or more processors 305 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 300. Each of the application processor and the auxiliary processor(s) can be configured to process and execute executable software code to perform the various functions of the electronic device 110 with which the block diagram schematic 300 operates. A storage device, such as memory 306, can optionally store the executable software code used by the one or more processors 305 during operation.

In this illustrative embodiment, the block diagram schematic 300 also includes a communication device 307 that can be configured for wired or wireless communication with one or more other devices or networks. The networks can include a wide area network, a local area network, and/or personal area network. The communication device 307 may also utilize wireless technology for communication, such as, but are not limited to, peer-to-peer or ad hoc communications such as HomeRF, Bluetooth and IEEE 802.11, and other forms of wireless communication such as infrared technology. The communication device 307 can include wireless communication circuitry, one of a receiver, a transmitter, or transceiver, and one or more antennas.

In one embodiment, the one or more processors 305 can be responsible for performing the primary functions of the electronic device with which the block diagram schematic 300 is operational. For example, in one embodiment the one or more processors 305 comprise one or more circuits operable with the user interface 304 to present presentation information to a user. This information can include images and/or video captured by one or more image capture devices 308 of the electronic device 110. Additionally, the one or more processors 305 can be operable with an audio output device 309 to deliver audio output to a user. The executable software code used by the one or more processors 305 can be configured as one or more modules that are operable with the one or more processors 305. Such modules can store instructions, control algorithms, and so forth.

In one or more embodiments, the block diagram schematic 300 includes an audio input/processor 311. The audio input/processor 311 can include hardware, executable code, and speech monitor executable code in one embodiment. The audio input/processor 311 can include, stored in memory 306, basic speech models, trained speech models, or other modules that are used by the audio input/processor 311 to receive and identify voice commands that are received with audio input captured by an audio input device. In one embodiment, the audio input/processor 311 can include a voice recognition engine. Regardless of the specific implementation utilized in the various embodiments, the audio input/processor 311 can access various speech models to identify speech commands in one or more embodiments.

The audio input/processor 311 is operable as an audio capture device to receive and capture audio input from a source, such as a person, authorized user, plurality of persons within an environment 312 about the electronic device 110. The audio input/processor 311 can include hardware, executable code, and speech monitor executable code in one embodiment. The audio input/processor 311 can be operable with one or more predefined authentication references stored in memory 306. In one or more embodiments, the audio input/processor 311 can receive and identify voice commands that are received with audio input captured by an audio input device. In one embodiment, the audio input/processor 311 can include a voice recognition engine. Regardless of the specific implementation utilized in the various embodiments, the audio input/processor 311 can access various speech models stored with the predefined authentication references to identify speech commands.

In one embodiment, the audio input/processor 311 is configured to implement a voice control feature that allows the electronic device 110 to function as a voice assistant device, which may be configured as a voice assistant engine. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 305 of the electronic device 110 to execute a control operation.

Various sensors 313 can be operable with the one or more processors 305. A first example of a sensor that can be included with the various sensors 313 is a touch sensor 310. The electronic device 110 can include one or more touch sensors, each of which can include a capacitive touch sensor, an infrared touch sensor, resistive touch sensors, or another touch-sensitive technology.

Another example of a sensor 313 is a geo-locator that serves as a location detector 314. In one embodiment, location detector 314 determines location data of the electronic device 110. Location can be determined by capturing the location data from a constellation of one or more earth orbiting satellites, or from a network of terrestrial base stations to determine an approximate location. The location detector 314 may also be able to determine location by locating or triangulating terrestrial base stations of a traditional cellular network, such as a CDMA network or GSM network, or from other local area networks, such as Wi-Fi networks.

Another example of a sensor 313 suitable for inclusion with the electronic device 110 include one or more motion sensors 324 that are operable to determine an orientation and/or movement of the electronic device 110 in three-dimensional space. Illustrating by example, the one or more motion sensors 324 can include an accelerometer, gyroscopes, or other device to detect device orientation and/or motion of the electronic device 110.

Another example of a sensor 313 is a force sensor. Where included, the force sensor can take various forms. For example, in one embodiment, the force sensor comprises resistive switches or a force switch array configured to detect contact with either the display or the housing of an electronic device. In another embodiment, the force sensor can be capacitive. In yet another embodiment, piezoelectric sensors can be configured to sense force as well.

A video processing system 316 can be included in the electronic device 110 and can be operable with the one or more processors 305. The video processing system 316 can be operable with one or more image capture devices 308, and can process one or more video frames with a first video stabilization operation or second video stabilization operation in response to a detected touch input as previously described. The one or more image capture devices 308 suitable for capturing video frames can comprise one or more of a conventional image capture device, such as camera 326, a depth image capture device, and, optionally, one or more proximity sensors.

In one embodiment, the one or more image capture devices 308 comprise a two-dimensional image capture device, such as that illustrated by camera 326. In one or more embodiments, the camera 326 comprises a two-dimensional Red-Green-Blue (RGB) image capture device. The one or more image capture devices 308 can also include an infrared image capture device. Other types of image capture devices suitable for inclusion with the one or more image capture devices 308 will be obvious to those of ordinary skill in the art having the benefit of this disclosure.

In one or more embodiments, the video processing system 316 can be operable with an environmental analyzer 317. The environmental analyzer 317 can be configured to process a video or depth scan of an object and determine whether the object matches predetermined criteria by comparing the image or depth scan to one or more predefined authentication references stored in memory 306. Working in conjunction with the environmental analyzer 317, in one or more embodiments the video processing system 316 can be configured to identify non-standard lighting conditions, including low-light conditions or unbalanced ambient light levels such as may occur when sun is shining through a window into a dark room. Beneficially, this optical recognition performed by the video processing system 316 operating in conjunction with the environmental analyzer 317 allows the amount of cropping that occurs when either using a single-handed touch input or multi-handed touch input video stabilization process to be increased or decreased as a function of the amount of light being captured in the video frames.

Other components 318 operable with the one or more processors 305 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 318 can also include a mechanical output component such as vibrating or motion-based mechanisms.

The other components 318 can optionally include a barometer operable to sense changes in air pressure due to elevation changes or differing pressures of the electronic device 110. The other components 318 can also optionally include a light sensor 320 that detects changes in optical intensity, color, light, or shadow. In one or more embodiments, the light sensor 320 is operable to determine whether the environment 312 of the electronic device 110 is a low-light environment, one example of which occurs when the light density within the environment 312 is less than one hundred lux.

In one or more embodiments, the one or more processors 305 can define one or more process engines. Examples of these process engines include a video stabilization processing engine 319, an artificial intelligence engine 321, a video quality analyzer 322, and a context engine 323. Each engine can be a component of the one or more processors 305, operable with the one or more processors 305, defined by the one or more processors 305, and/or integrated into the one or more processors 305. Other configurations for these engines, including as software or firmware modules operable on the one or more processors 305, will be obvious to those of ordinary skill in the art having the benefit of this disclosure.

For instance, a context engine 323 can be operable with the various sensors to detect, infer, capture, and otherwise detect external conditions occurring within the environment 312 of the electronic device 110. For example, where included one embodiment of the context engine 323 determines assessed contexts and frameworks using adjustable algorithms of context assessment employing information, data, and events. These assessments may be learned through repetitive data analysis. Alternatively, a user may employ the user interface 304 to enter various parameters, constructs, rules, and/or paradigms that instruct or otherwise guide the context engine 323 in detecting, for example, when the electronic device 110 is being supported by a multi-handed touch input or a single-handed touch input and other contextual information. The context engine 323 can comprise an artificial neural network or other similar technology in one or more embodiments.

The video stabilization processing engine 319 can perform video stabilization process to anticipate where a subject is moving within one or more video frames of a plurality of video frames and then crop a portion of each frame to produce a stable resulting video that optimizes video quality, reduces image blur, or performs other operations. The video stabilization processing engine 319 can also perform a selection of a best video stabilization process to use based upon the type of touch input being received by the one or more touch sensors 310. The video stabilization processing engine 319 can optionally operate in conjunction with the artificial intelligence engine 321 to perform video stabilization as well. Alternatively, the video stabilization processing engine 319 can operate in conjunction with the video processing system 316 to perform the automatic video stabilization and/or post-processing operations as well.

The video quality analyzer 322 can be configured to determine what image quality level exists when, for example, the one or more image capture devices 308 capture the plurality of video frames in response to user input received by the user interface 304 initiating a video capture operation. For example, if the one or more image capture devices 308 are simply in the viewfinder mode with their captured image frame stream being only presented on the display 114 of the electronic device 110, the video quality analyzer 322 may function to determine whether the environment 312 is experiencing a low-light condition or an unbalanced ambient light condition, and so forth.

In one or more embodiments, each of the video stabilization processing engine 319, the artificial intelligence engine 321, the video quality analyzer 322, and the context engine 323 is operable with the one or more processors 305. In some embodiments, the one or more processors 305 can control the video stabilization processing engine 319, the artificial intelligence engine 321, the video quality analyzer 322, and the context engine 323. In other embodiments, each of the video stabilization processing engine 319, the artificial intelligence engine 321, the video quality analyzer 322, and the context engine 323 can operate independently, delivering information to the one or more processors 305. The video stabilization processing engine 319, the artificial intelligence engine 321, the video quality analyzer 322, and the context engine 323 can each receive data from the various sensors 313. In one or more embodiments, the one or more processors 305 are configured to perform the operations of the video stabilization processing engine 319, the artificial intelligence engine 321, the video quality analyzer 322, and the context engine 323.

When executing operations such as those method steps described above with reference to FIGS. 1 and 2, in one or more embodiments the one or more image capture devices 308 select a video stabilization process to process the captured plurality of video frames as a function of whether the electronic device 110 is supported by a multi-handed touch input or a single-handed touch input, with the former situation cropping away less of each video frame than the latter. In one or more embodiments, the amount of cropping used in the video stabilization process selected and applied to the plurality of video frames can be affected by the lighting conditions detected by the light sensor 320 and/or motion detected by the motion sensor 324.

Accordingly, as shown in FIG. 3, in one or more embodiments the electronic device 110 includes a user interface 304 receiving user input initiating a video capture operation by an image capture device 308, one example of which is camera 326. A light sensor 320 determines whether the electronic device 110 is situated within an environment 312 that is experiencing a low-light condition.

One or more touch sensors 310 determine whether one or more of the device housing defined by the first device housing 301 and the second device housing 302 of the electronic device 110 and/or a display 114 of the electronic device 110 is receiving one of multi-handed touch input or single-handed touch input. One or more processors 305 of the electronic device 110 then cause the captured video frames to undergo a first video stabilization process when the one or more of the device housing defined by the first device housing 301 and the second device housing 302 and/or the display 114 of the electronic device 110 is receiving single-handed touch input and cause the captured video frames to undergo a second video stabilization process in response to the user input when the one or more of the device housing defined by the first device housing 301 and the second device housing 302 of the electronic device 110 and/or the display 114 of the electronic device 110 is receiving the multi-handed touch input.

In one or more embodiments, first video stabilization process is based upon, in that it crops, a portion of each frame of the plurality of video frames that is smaller than the second video stabilization process. Said differently, in one or more embodiments both the first video stabilization process and the second video stabilization process are defined by the amount of cropping applied, with the first video stabilization process cropping more of the original video frames than the second video stabilization process. In one or more embodiments, this amount of cropping can be increased in low-light environments defined by a light density within the environment 312 being less than a predefined lux threshold, one example of which is one hundred. Additionally, the amount of cropping can be increased when the motion sensor 324 determines that the stability of the electronic device is decreased.

Figure 5:
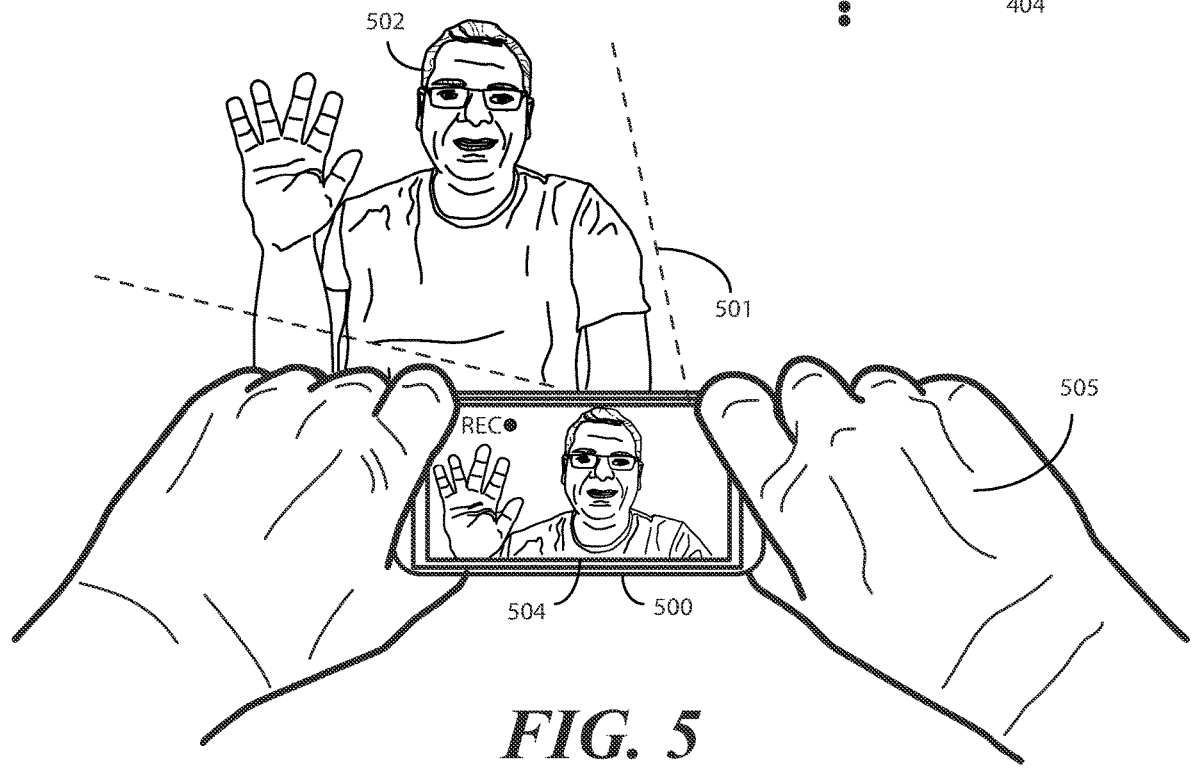
FIG. 5 illustrates one explanatory system in accordance with one or more embodiments of the disclosure.

Turning now to FIG. 5, illustrated therein is an example of an electronic device 500 configured in accordance with one or more embodiments of the disclosure in operation. Note that the electronic device 500 of FIG. 5, while including one or more of the components described above with reference to the block diagram schematic (300) of FIG. 3, is configured as a "candy bar" device having a single device housing rather than the first device housing (301), the second device housing (302), and the hinge (303) of the electronic device (110) of FIG. 3.

As shown in FIG. 5, an image capture device situated on a major surface of the electronic device 500 facing a subject 502. In this illustrative embodiment, the one or more touch sensors determine this by detecting that the electronic device 500 is being touched at opposite ends of a touch-sensitive display 504 positioned along a major face of the electronic device 500. Additionally, another image capture device, which is positioned under the left hand of the user 505 capturing the plurality of video frames 501 of the subject 502, has its field of view obscured by that left hand. This confirms that the electronic device 500 is being supported by a multi-handed touch input.

The touch-sensitive display 504 of FIG. 5 has already received user input initiating a video capture operation, which has commenced. That this has occurred can be seen by the fact that "REC*" appears in the upper left-hand corner of the touch-sensitive display 504. Accordingly, the image capture device is capturing, in response to the user input, a plurality of video frames 501 of the subject 500.

At the same time, one or more touch sensors of the electronic device 500 determine that the electronic device is being supported by a multi-handed touch input. In particular, the user 505 has a right hand placed to one side of the touch-sensitive display 504, while a left hand is placed to another side of the touch-sensitive display 504. This allows the user 505 to see the touch-sensitive display 504 between the hands. In this illustrative embodiment, the one or more touch sensors detect the multi-handed touch input in two ways: first, the one or more touch sensors detect the multi-handed touch input by detecting a first touch input from the right hand at a first location and a second touch input from the left hand at a second location that is separated by the touch-sensitive display 504. Said differently, the multi-handed touch input is defined by the electronic device 500 being touched at opposite ends of the touch-sensitive display 504, which is positioned along major face of the electronic device 500. This indicates a multi-handed touch input.

However, the multi-handed touch input is confirmed due to the fact that a front facing imager (situated beneath the left hand of the user) is blocked by the left hand as well. Said differently, one or more processors of the electronic device 500 confirm that the electronic device 500 is supported by the multi-handed touch input due to the fact that the field of view of this imager is obscured by an object proximately located with the electronic device 500, which is the left hand of the user 505.

Since the electronic device 500 is being supported by the multi-handed touch input, it is likely more stable than if it were being supported by single-handed touch input. Accordingly, when performing a video stabilization process, less content needs to be cropped away to provide a stable video because movement is minimal. Accordingly, the one or more processors process the plurality of video frames with a first video stabilization operation that is a function of a larger portion of each frame of the plurality of video frames 501 than a second video stabilization operation that is used with single-handed touch input.

In one or more embodiments, the amount of each frame that is cropped when processed by the first video stabilization operation can be affected by motion. Illustrating by example, a motion sensor can determine a stability indication of the electronic device 500 in response to the user input initiating the video capture operation. The amount that is cropped can be increased when the stability indication of the electronic device 500 decreases. Said differently, the portion of the frame remaining after the first video stabilization operation can be increased when the stability indication of the electronic device 500 is less than a predefined threshold in one or more embodiments.

Figure 6:
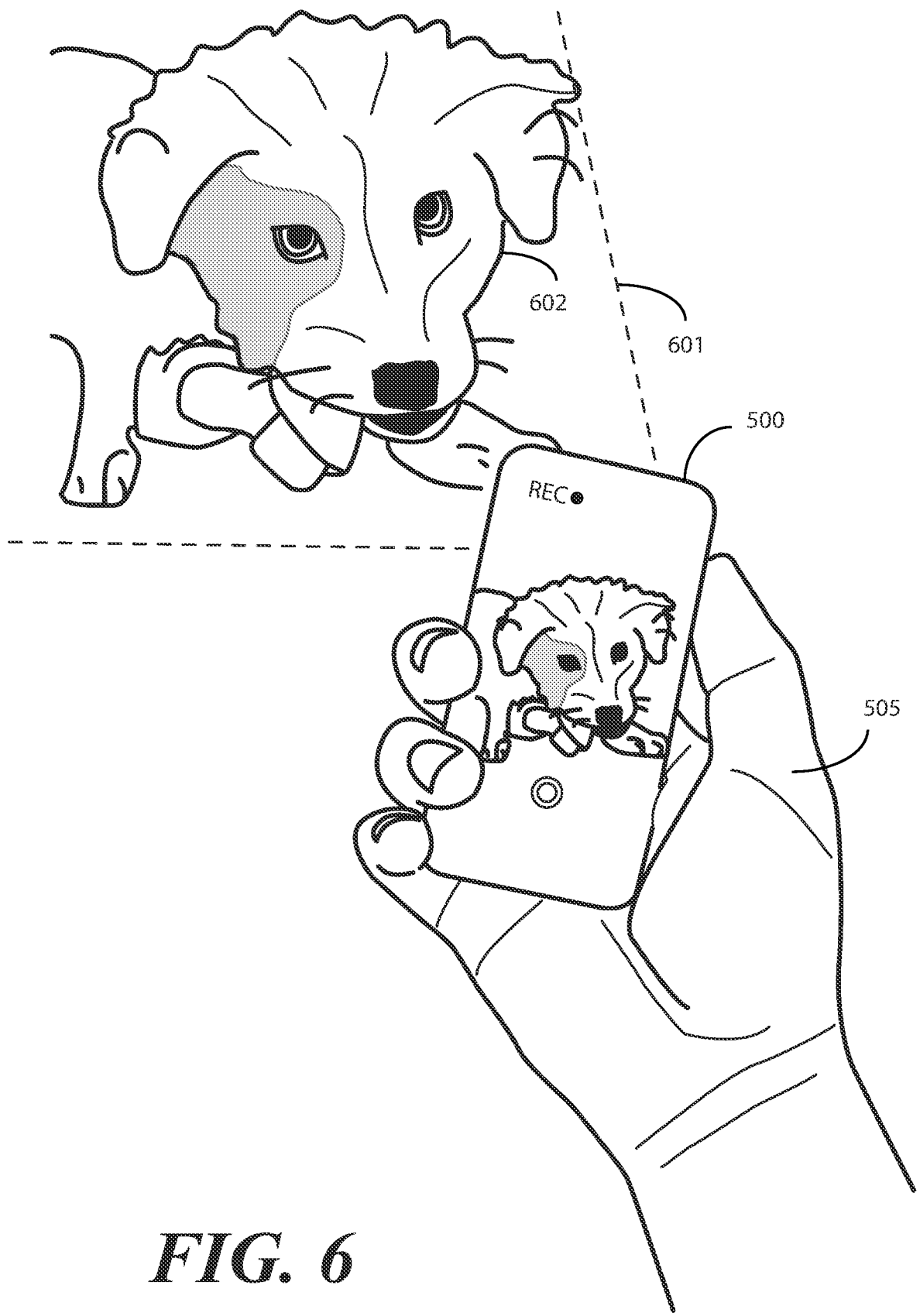
FIG. 6 illustrates another explanatory system in accordance with one or more embodiments of the disclosure.

By contrast, turning now to FIG. 6, in this example the user 505 is again employing an electronic device 500 to capture a plurality of video frames 601 of a subject 602.

However, in this situation the electronic device 500 is being supported by a single-handed touch input, which is detected by the one or more touch sensors. Since this is the case, in response to user input initiating a video capture operation, the one or more processors of the electronic device 500 process the plurality of video frames 601 with a second video stabilization operation that crops more of each video frames of the plurality of video frames 601 away since the electronic device 500 is likely to be less stable when supported by a single hand. As before, a stability indication of the electronic device 500 can be used to increase, as the electronic device 500 moves more, or decrease, when the electronic device 500 is more stable, the amount of cropping applied when processing the plurality of video frames 501 with the second video stabilization operation.

Figure 7:
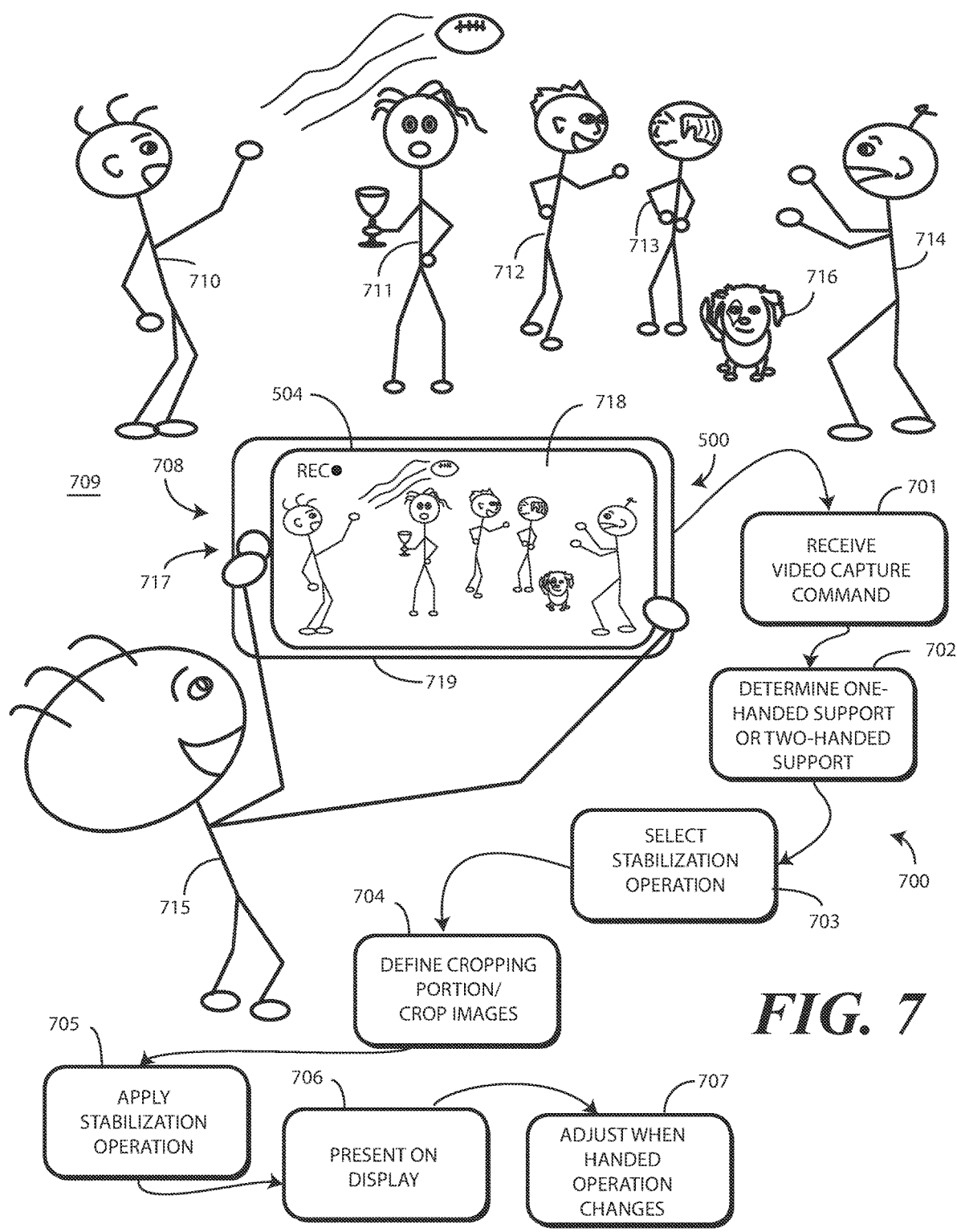
FIG. 7 illustrates yet another explanatory method and system in accordance with one or more embodiments of the disclosure.

Turning now to FIG. 7, illustrates therein is yet another method 700 and system 708 configured in accordance with one or more embodiments of the disclosure. An electronic device 500 is positioned within an environment 709. A plurality of persons 710,711,712,713,714,715 is situated within the environment 709 of the electronic device 500. Here, there are six persons 710,711,712,713,714,715 situated within the environment 709 of the electronic device 500. Person 715 is an authorized user of the electronic device 500, while persons 710,711,712,713,714 are friends, family, or acquaintances of the authorized user.

In this illustration, used to more particularly describe various features and advantages of embodiments of the disclosure, there is a lot occurring. The scene set forth in the environment 709 of the electronic device 500 is not dissimilar to that which may occur at a family gathering, family reunion, school reunion, and so forth. In this illustration, person 710 is passing a football to person 714. Person 711 is watching the action while sipping on a cocktail. Person 712 is having a conversation with person 713. Music is playing. A dog 716 is enjoying the weather and is dreaming of his next meal. Desirous of memorializing this moment of joy and whimsy, person 715 delivers user input 717 to a user interface of the electronic device 500 initiating a video capture operation to capture a video 718 of the environment 709. This user input 717 is received by one or more processors of the electronic device 500 at step 701. Step 701 then includes capturing a plurality of video frames in response to the user input 717.

In this illustrative example, the user input 717 comprises touch input. However, the user input 717 can take other forms as well. In this illustration, person 715 delivers a single press to a button with their finger to deliver the user input 717 initiating the video capture operation to the user interface of the electronic device 500. In another embodiment, the person 715 may deliver the user input 717 initiating the video capture operation to the user interface of the electronic device 500 by touching a user interface target presented on the display 504.

In another embodiment, person 715 may deliver the user input 717 initiating the video capture operation to the user interface of the electronic device 500 by delivering an audio command to an audio input of the electronic device 500. In still another embodiment, person 715 may deliver gesture input to deliver the user input 717 initiating the video capture operation to the user interface of the electronic device 500. In still another embodiment, person 715 delivers the user input 717 initiating the video capture operation to the user interface of the electronic device 500 by delivering touch or gesture input to a companion device of the electronic device 500, such as a smart watch.

In still another embodiment, person 715 may deliver user input 717 initiating the video capture operation to the user interface by performing a sequence of operations. Illustrating by example, in one or more embodiments person 715 can deliver the user input 717 by holding the electronic device 500 in a stationary position, as well as in a "pointing direction," i.e., not flat, while speaking or blinking an eye or swiping a hand above the display 504 in free space. Other methods for delivering the user input 717 could include speaking a "key phrase" such as "say cheese, "smile," and so forth Still other methods for delivering the user input 717 initiating the video capture operation to the user interface of the electronic device 500 will be obvious to those of ordinary skill in the art having the benefit of this disclosure.

Person 715 really wants to capture this entire scene in a video he can share with each other person 710,711,712,713, 714. He wants to catch all the action and whimsy, including the spiraling football, as well as the sweat pouring off or person 714 while trying to catch the same. Fortunately, the electronic device 500 is configured in accordance with embodiments of the disclosure. Accordingly, person 715 understands that less cropping of the video in a video stabilization process would be desired. Rather than having to scroll through a myriad of user settings—if the crop setting was even available—to ensure minimum cropping all the person 715 has to do is touch the electronic device 500 with two hands. Thus, simply by supporting the electronic device 500 with a multi-handed touch input, person 715 knows that the amount of content retained in each video frame of a plurality of video frames captured will be maximized.

At step 702, one or more touch sensors of the electronic device 500 determine whether one or more of a device housing 719 of the electronic device 500 and/or a display 504 of the electronic device 500 is receiving a single-handed touch input or a multi-handed touch input. As shown in FIG. 7, person 715 is indeed supporting the electronic device 500 with multi-handed touch input. In one or more embodiments, step 703 determines this by detecting a first touch input and a second touch input situated on opposite sides of the display 504, which is touch-sensitive in this illustrative embodiment.

At step 703, one or more processors of the electronic device 500 select a video stabilization process. In one or more embodiments, the selection is made from a first video stabilization operation when the electronic device 500 is being supported by the multi-handed touch input and a second video stabilization operation when the electronic device 500 is being supported by a single-handed touch input. Since the electronic device 500 is being supported by the multi-handed touch input, the first video stabilization operation is selected at step 703.

At step 704, one or more processors of the electronic device 500 define the amount of content to be cropped using the first video stabilization operation. As noted above, the amount cropped can include a default value that can be increased, or decreased, as a function of the stability indication of the electronic device 500, lighting conditions within the environment 709, and other factors. At step 705 the one or more processors of the electronic device 500 process the captured plurality of video frames using the first video stabilization operation. This results in cropping a portion of each of the video frames of the plurality of video frames to produce a stable image.

The resulting video 718 can then be presented on the display 504 to person 715 at step 706, who appears very pleased. It should be noted that the video stabilization process selected can change when the number of hands supporting the electronic device 500 changes. Thus, at step 707 the method 700 can repeat with the one or more processors of the electronic device 500 causing the plurality of video frames to transition from undergoing the first video stabilization process to undergoing the second video stabilization process when device housing 719 of the electronic device 500 and/or the display 504 of the electronic device 500 transitions from receiving the multi-handed touch input shown in FIG. 7 to a single-handed touch input.

Figure 8:
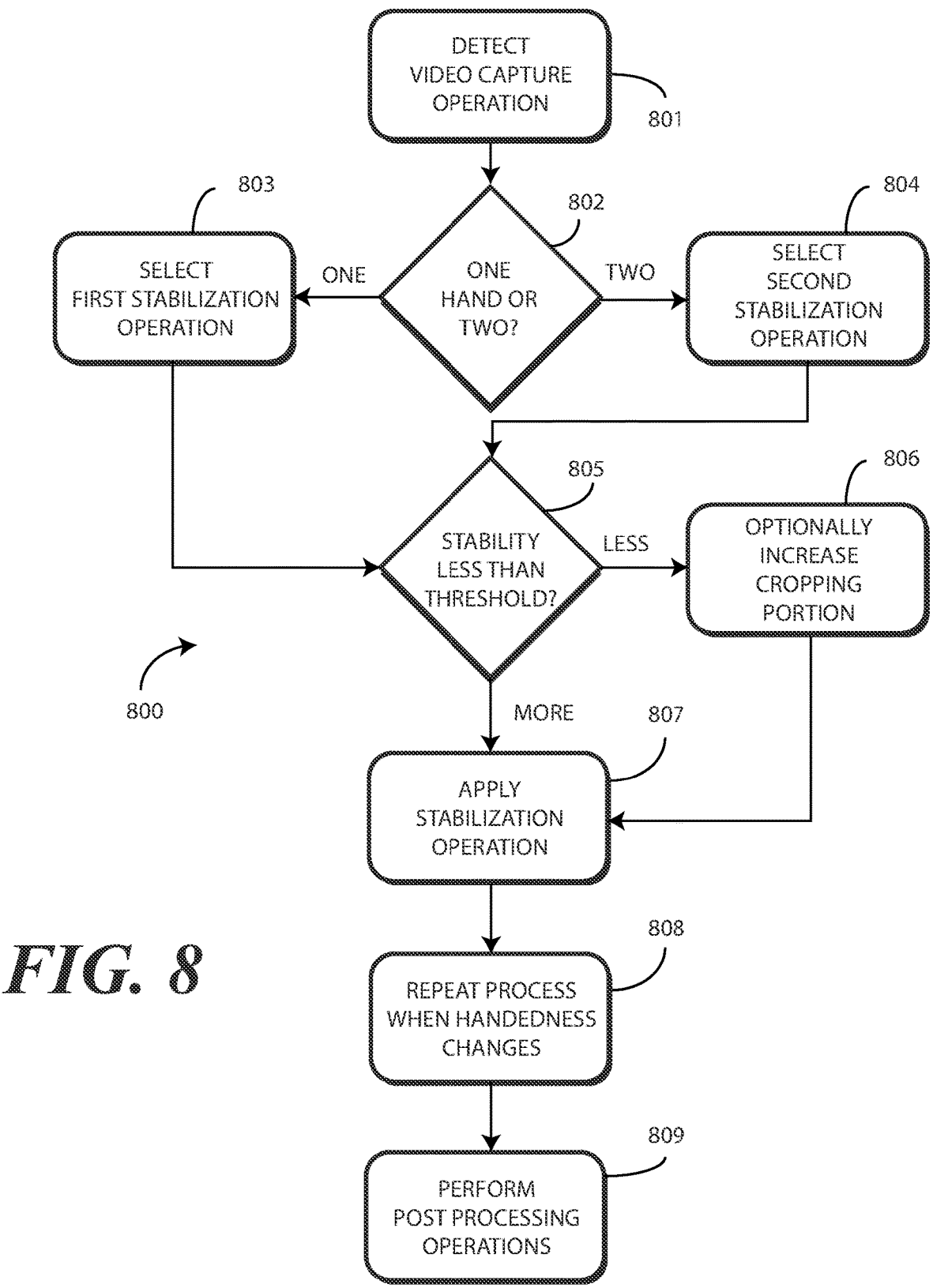
FIG. 8 illustrates still another explanatory method in accordance with one or more embodiments of the disclosure.

A summary of the method 700 of FIG. 7 is shown in FIG. 8. Turning now to FIG. 8, at step 801 a method 800 in an electronic device receives, by a user interface, user input initiating a video capture operation. At step 801, one or more processors of the electronic device cause an image capture operation to capture a plurality of video frames in response to the user input.

At decision 802, one or more touch sensors determine whether one or more of a device housing of the electronic device and/or a display of the electronic device is receiving one of multi-handed touch input or single-handed touch input. The one or more processors select a first video stabilization process when the electronic device is being supported by the single-handed touch input at step 803. By contrast, the one or more processors select a second video stabilization process when the electronic device is supported by the multi-handed touch input at step 804. In one or more embodiments, the first video stabilization process is based upon a portion of each frame of the plurality of video frames that is smaller than the second video stabilization process due to the fact that more of each frame is cropped.

Decision 805 includes a motion detector determining whether a stability indication of the electronic device is below a predefined threshold. In one or more embodiments, the portion of each frame remaining after the respective video stabilization process is adjusted as a function of motion of the electronic device. Illustrating by example, the portion can be increased when the stability indication of the electronic device increases at step 806.

At step 807, the one or more processors apply the selected video stabilization process. In one or more embodiments, the one or more processors cause the plurality of video frames to undergo a first video stabilization process when the one or more of the device housing of the electronic device and/or the display of the electronic device is receiving the single-handed touch input at step 807. By contrast, the one or more processors cause the plurality of video frames to undergo a second video stabilization process when the one or more of the device housing of the electronic device and/or the display of the electronic device is receiving the multi-handed touch input at step 807.

At step 808, the process repeats when the handedness changes. Said differently, at step 808 the one or more processors cause the plurality of video frames to transition from undergoing the first video stabilization process to undergoing the second video stabilization process when device housing of the electronic device and/or the display of the electronic device transitions. Post processing operations can then be performed at step 809. These post processing operations include saving the resulting video to memory, allowing a user to further edit the resulting video, sending the resulting video to another electronic device, and so forth. Other examples of post-processing operations will be obvious to those of ordinary skill in the art having the benefit of this disclosure.

Figure 9:
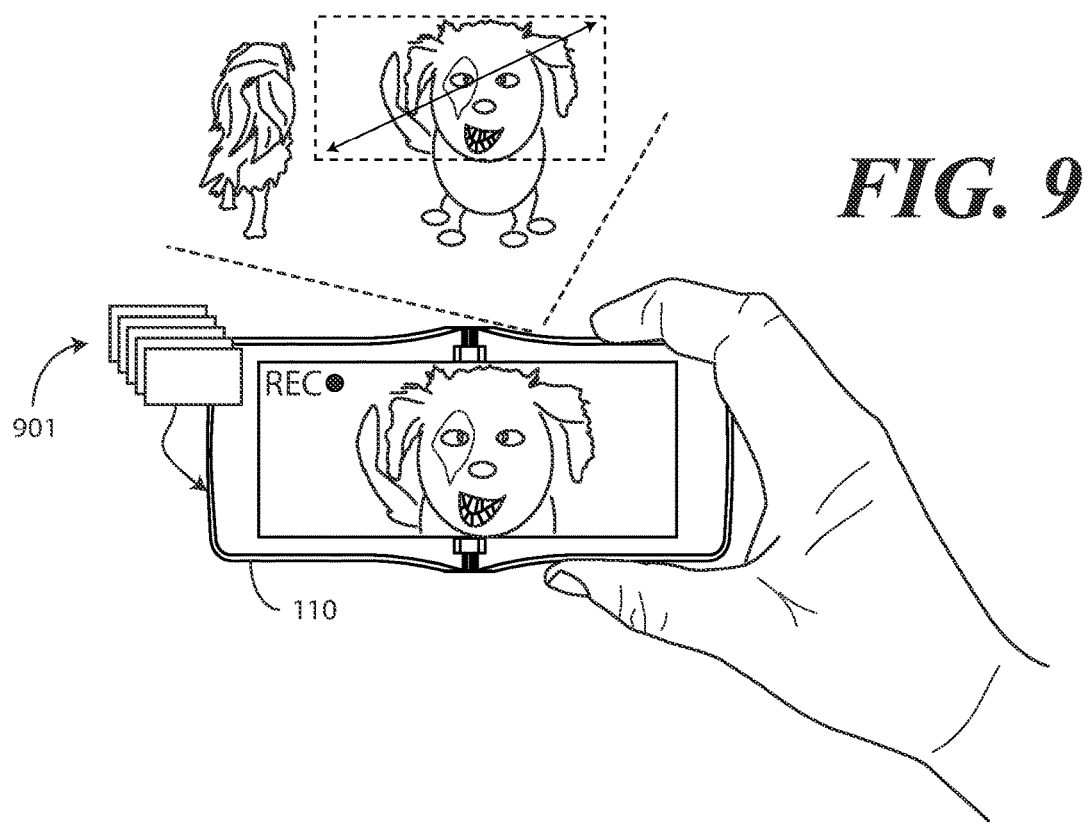
FIG. 9 illustrates one explanatory system processing a plurality of video frames with a first video stabilization operation in accordance with one or more embodiments of the disclosure.
Figure 10:
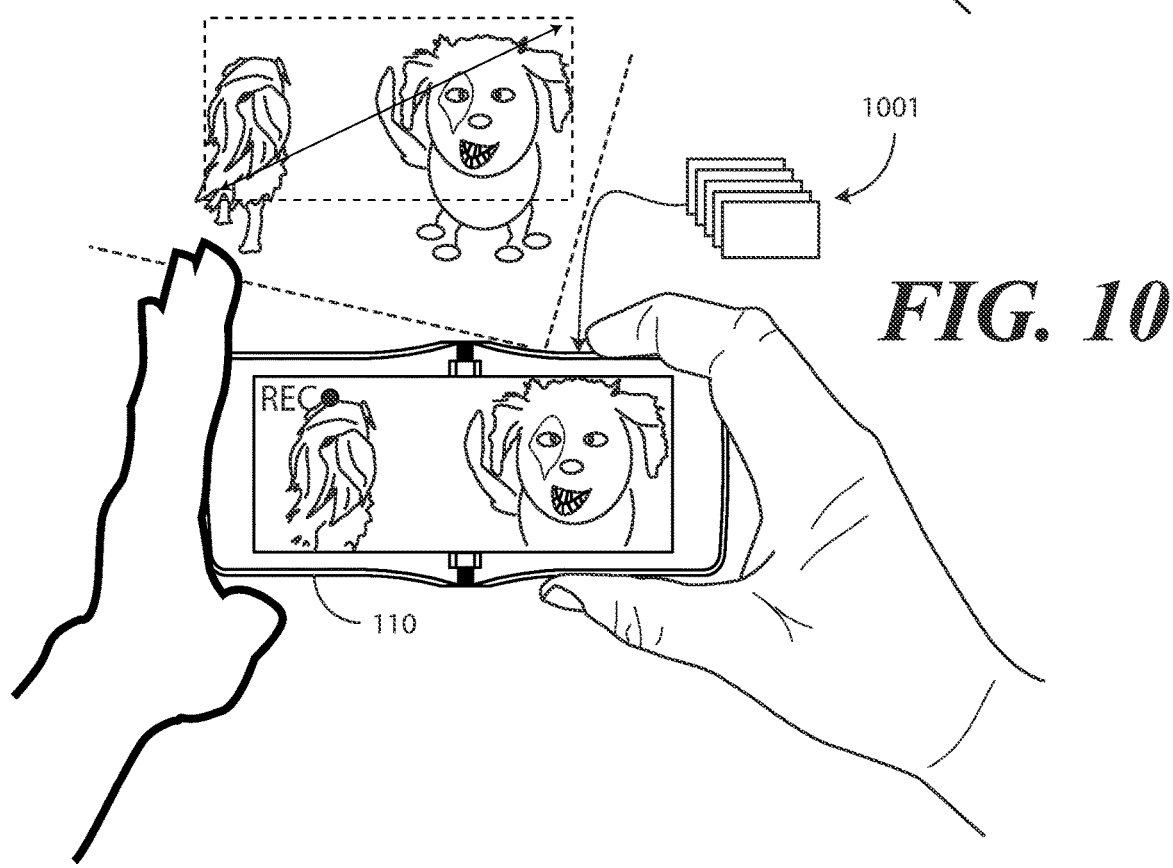
FIG. 10 illustrates one explanatory system processing a plurality of video frames with a second video stabilization operation in accordance with one or more embodiments of the disclosure.

Turning now to FIGS. 9 and 10, illustrated therein is the difference in cropping. In FIG. 9, the electronic device 110 is being supported by a single-handed touch input when an image capture device captures one or more video frames 901. As shown, a larger portion of the plurality of video frames 901 is cropped away than in FIG. 10, where a smaller portion of the one or more video frames 1001 is cropped away when the electronic device 110 is being supported by a multi-handed touch input. While both yield equally stable videos, more of the scene remains in the cropped video frames when the electronic device 110 is supported by the multi-handed touch input.

Figure 11:
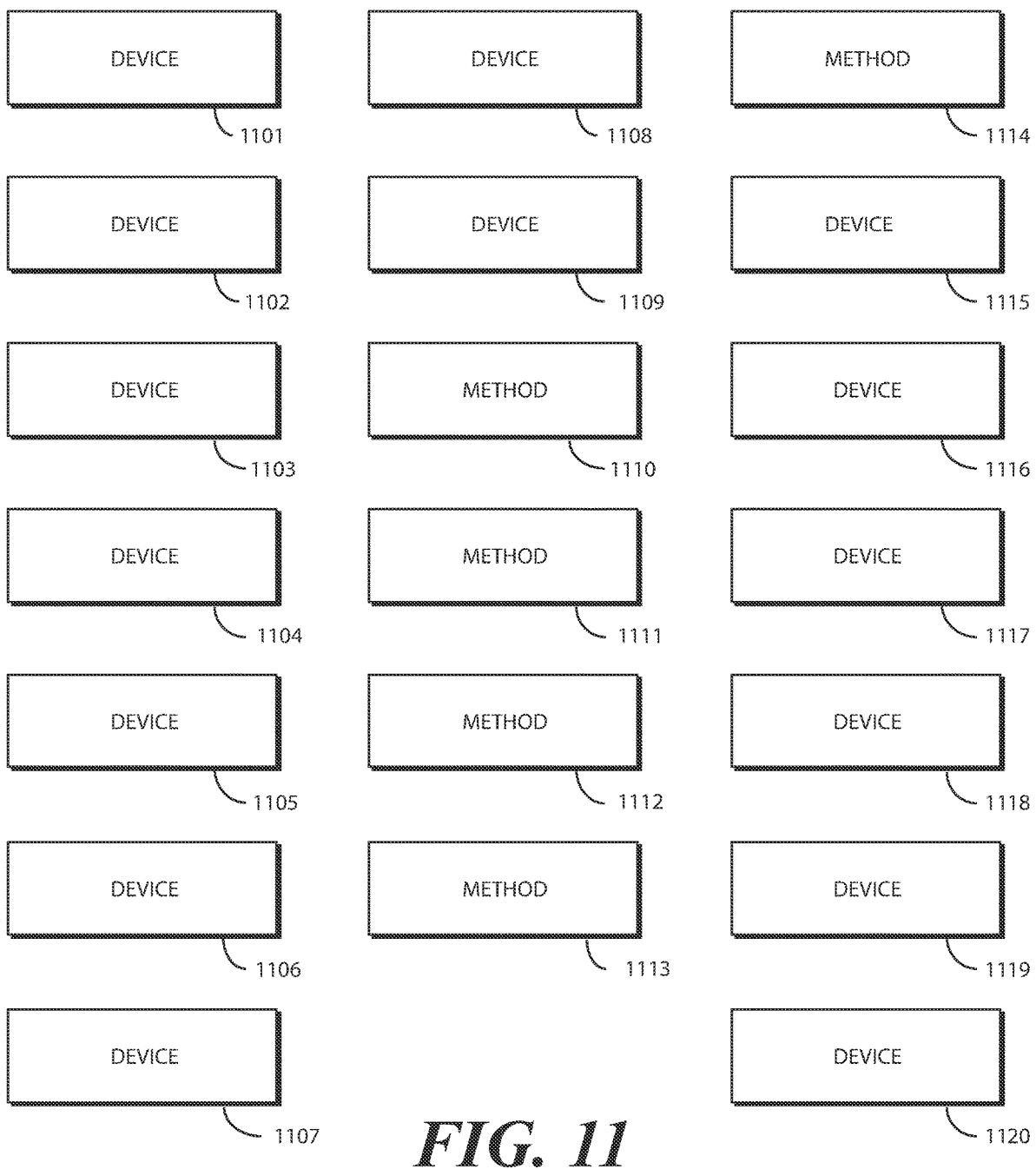
FIG. 11 illustrates various embodiments of the disclosure.

Turning now to FIG. 11, illustrated therein are various embodiments of the disclosure. The embodiments of FIG. 11 are shown as labeled boxes in FIG. 11 due to the fact that the individual components of these embodiments have been illustrated in detail in FIGS. 1-10, which precede FIG. 11. Accordingly, since these items have previously been illustrated and described, their repeated illustration is no longer essential for a proper understanding of these embodiments. Thus, the embodiments are shown as labeled boxes.

At 1101, an electronic device comprises a device housing supporting a user interface, one or more touch sensors, and at least one image capture device. At 1101, the electronic device comprises one or more processors operable with the user interface, the one or more touch sensors, and the at least one image capture device.

At 1101, the one or more processors cause, in response to the user interface receiving user input initiating a video capture operation, the at least one image capture device to capture a plurality of video frames. At 1101, the plurality of video frames are processed by a first video stabilization operation when the one or more touch sensors detect a multi-handed touch input, and are processed by a second video stabilization operation when the one or more touch sensors detect a single-handed touch input. At 1101, the first video stabilization operation and the second video stabilization operation are different.

At 1102, the first video stabilization operation of 1101 is a function of a first cropped portion of the plurality of video frames. At 1103, the second video stabilization operation of 1102 is a function of a second cropped portion of the plurality of video frames. At 1104, the first cropped portion of 1103 comprises a larger portion of the plurality of video frames than the second cropped portion.

At 1105, the one or more processors of 1104 process the plurality of video frames with the first video stabilization operation when the one or more touch sensors detect the multi-handed touch input while the user input initiating the video capture operation is received.

At 1106, the user interface of 1104 comprises a touch-sensitive display. At 1106, the one or more touch sensors detect the multi-handed touch input by detecting a first touch input at a first location and a second touch input at a second location that is separated from the first location by the touch-sensitive display.

At 1107, the user interface of 1104 comprises a touch-sensitive display positioned on a first major surface of the electronic device. At 1107, the one or more touch sensors detect the multi-handed touch input by detecting a first touch input on the touch-sensitive display and a second touch input on a second major surface of the electronic device.

At 1108, the user interface of 1104 comprises a touch-sensitive display positioned on a first major surface of the electronic device. At 1108, the at least one image capture device comprises a first image capture device positioned on the first major surface and a second image capture device positioned on a second major surface of the electronic device. At 1108, the one or more processors process the plurality of video frames with the first video stabilization operation when both a field of view of one of the first image capture device or the second image capture device is obscured by an object proximately located with the electronic device and the one or more touch sensors detect the multi-handed touch input.

At 1109, the first cropped portion of 1104 is at least twenty percent larger than second cropped portion.

At 1110, a method in an electronic device comprises receiving, by a user interface, user input initiating a video capture operation. At 1110 the method comprises determining, with one or more touch sensors, whether the electronic device is being supported by a multi-handed touch input or a single-handed touch input.

At 1110, the method comprises capturing, in response to the user input with an image capture device, a plurality of video frames. At 1110, the method comprises processing, with one or more processors, the plurality of video frames with a first video stabilization operation when the electronic device is being supported by the multi-handed touch input and processing, with the one or more processors, the plurality of video frames with a second video stabilization operation when the electronic device is being supported by the single-handed touch input. At 1111, the first video stabilization operation of 1110 is a function of a larger portion of each frame of the plurality of video frames than the second video stabilization operation.

At 1112, the determining of 1111 whether the electronic device is being supported by the multi-handed touch input further comprises determining, with another image capture device, whether a field of view of the another image capture device is obscured by a hand or finger. At 1113, the multi-handed touch input of 1111 is defined by the electronic device being touched at opposite ends of a touch-sensitive display positioned along a major face of the electronic device.

At 1114, the method of 1111 further comprises detecting, with a motion sensor, a stability indication of the electronic device in response to the user input initiating the video capture operation. At 1114, the method comprises increasing, by one or more processors operable with the image capture device, the larger portion of each frame of the plurality of video frames when the stability indication is less than a predefined threshold.

At 1115, an electronic device comprises a user interface receiving user input initiating a video capture operation by an image capture device of the electronic device. At 1115, the electronic device comprises one or more touch sensors determining whether one or more of a device housing of the electronic device and/or a display of the electronic device is receiving one of multi-handed touch input or single-handed touch input.

At 1115, the electronic device comprises one or more processors causing the image capture device to capture a plurality of video frames in response to the user input and one of: cause the plurality of video frames to undergo a first video stabilization process when the one or more of the device housing of the electronic device and/or the display of the electronic device is receiving the single-handed touch input; and cause the plurality to undergo a second video stabilization process when the one or more of the device housing of the electronic device and/or the display of the electronic device is receiving the multi-handed touch input. At 1115, the first video stabilization process is based upon a portion of each frame of the plurality of video frames that is smaller than the second video stabilization process.

At 1116, the one or more processors of 1115 further crop the each frame of the plurality of video frames to define one or both of the first video stabilization process and/or the second video stabilization process. At 1117, the electronic device of 1115 further comprises a motion detector determining a stability of the electronic device. At 1117, the portion of each frame of the plurality of video frames is increased when the stability of the electronic device increases.

At 1118, the user interface of 1115 comprises a touch sensitive display. At 1118, the one or more processors cause presentation of the plurality of video frames on the touch sensitive display after being processed by the first video stabilization process or the second video stabilization process.

At 1119, the one or more processors of 1115 cause the plurality of video frames to transition from undergoing the first video stabilization process to undergoing the second video stabilization process when device housing of the electronic device and/or the display of the electronic device transitions from receiving the single-handed touch input to receiving the multi-handed touch input.

At 1120, the electronic device of 1116 further comprises another image capture device. At 1120, the multi-handed touch input is determined when a field of view of the another image capture device is obscured by an object delivering touch input to the one or more touch sensors.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a device housing supporting one or more touch sensors; and
one or more processors operable with the one or more touch sensors, the one or more processors processing a plurality of video frames:
using a first video stabilization operation when the plurality of video frames are captured while the one or more touch sensors detect a multi-handed touch input; and
using a second video stabilization operation that is different from the first video stabilization operation when the plurality of video frames are captured while the one or more touch sensors detect a single-handed touch input.

2. The electronic device of claim 1, wherein the first video stabilization operation is a function of a first cropped portion of the plurality of video frames.

3. The electronic device of claim 2, wherein the second video stabilization operation is a function of a second cropped portion of the plurality of video frames.

4. The electronic device of claim 3, wherein the first cropped portion comprises a larger portion of the plurality of video frames than the second cropped portion.

5. The electronic device of claim 4, wherein the one or more processors process the plurality of video frames with the first video stabilization operation when the one or more touch sensors detect the multi-handed touch input while user input initiates capture of the plurality of video frames.

6. The electronic device of claim 4, further comprising a touch-sensitive display, wherein the one or more touch sensors detect the multi-handed touch input by detecting a first touch input at a first location and a second touch input at a second location that is separated from the first location by the touch-sensitive display.

7. The electronic device of claim 4, further comprising a touch-sensitive display positioned on a first major surface of the electronic device, wherein the one or more touch sensors detect the multi-handed touch input by detecting a first touch input on the touch-sensitive display and a second touch input on a second major surface of the electronic device.

8. The electronic device of claim 4, further comprising:
a touch-sensitive display positioned on a first major surface of the electronic device;
a first image capture device positioned on the first major surface; and
a second image capture device positioned on a second major surface of the electronic device;
wherein the one or more processors process the plurality of video frames with the first video stabilization operation when both a field of view of one of the first image capture device or the second image capture device is obscured by an object proximately located with the electronic device and the one or more touch sensors detect the multi-handed touch input.

9. The electronic device of claim 4, wherein the first cropped portion is at least twenty percent larger than second cropped portion.

10. A method in an electronic device, the method comprising:
determining, with one or more touch sensors, whether the electronic device is being supported by a multi-handed touch input or a single-handed touch input;
processing, with one or more processors, a plurality of video frames with a first video stabilization operation when the electronic device is being supported by the multi-handed touch input; and
processing, with the one or more processors, the plurality of video frames with a second video stabilization operation when the electronic device is being supported by the single-handed touch input.

11. The method of claim 10, wherein the first video stabilization operation is a function of a larger portion of each frame of the plurality of video frames than the second video stabilization operation.

12. The method of claim 11, wherein the determining whether the electronic device is being supported by the multi-handed touch input further comprises determining, with an image capture device, whether a field of view of the image capture device is obscured by a hand or finger.

13. The method of claim 11, wherein the multi-handed touch input is defined by the electronic device being touched at opposite ends of a touch-sensitive display positioned along a major face of the electronic device.

14. The method of claim 11, further comprising detecting, with a motion sensor, a stability indication of the electronic device and increasing, by one or more processors, the larger portion of the each frame of the plurality of video frames when the stability indication is less than a predefined threshold.

15. An electronic device, comprising:
one or more touch sensors determining whether one or more of a device housing of the electronic device and/or a display of the electronic device is receiving one of multi-handed touch input or single-handed touch input; and
one or more processors causing one of:
a plurality of video frames to undergo a first video stabilization process when the one or more of the device housing of the electronic device and/or the display of the electronic device is receiving the single-handed touch input; and
the plurality to undergo a second video stabilization process when the one or more of the device housing of the electronic device and/or the display of the electronic device is receiving the multi-handed touch input;
wherein the first video stabilization process is based upon a portion of each frame of the plurality of video frames that is smaller than the second video stabilization process.

16. The electronic device of claim 15, the one or more processors further cropping the each frame of the plurality of video frames to define one or both of the first video stabilization process and/or the second video stabilization process.

17. The electronic device of claim 16, further comprising an image capture device, wherein the multi-handed touch input is determined when a field of view of the image capture device is obscured by an object delivering touch input to the one or more touch sensors.

18. The electronic device of claim 15, further comprising a motion detector determining a stability of the electronic device, wherein the portion of the each frame of the plurality of video frames is increased when the stability of the electronic device increases.

19. The electronic device of claim 15, further comprising a touch sensitive display, the one or more processors causing presentation of the plurality of video frames on the touch sensitive display after being processed by the first video stabilization process or the second video stabilization process.

20. The electronic device of claim 15, the one or more processors causing the plurality of video frames to transition from undergoing the first video stabilization process to undergoing the second video stabilization process when device housing of the electronic device and/or the display of the electronic device transitions from receiving the single-handed touch input to receiving the multi-handed touch input.

* * * * *